US006462879B2

(12) United States Patent
Masuda

(10) Patent No.: US 6,462,879 B2
(45) Date of Patent: Oct. 8, 2002

(54) OPTICAL WRITING DEVICE AND IMAGE FORMING APPARATUS AND METHOD USING THE SAME

(75) Inventor: Koji Masuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/797,591

(22) Filed: Mar. 5, 2001

(65) Prior Publication Data

US 2001/0021067 A1 Sep. 13, 2001

(30) Foreign Application Priority Data

Mar. 7, 2000 (JP) ....................................... 2000-062652

(51) Int. Cl.[7] ................................................ G02B 27/10
(52) U.S. Cl. ....................................... 359/626; 359/619
(58) Field of Search ................................ 359/626, 623, 359/619, 455, 137, 625; 438/487; 372/24; 356/449

(56) References Cited

U.S. PATENT DOCUMENTS 5,005,969 A * 4/1991 Kataoka ..................... 353/122
5,035,486 A * 7/1991 Inokuchi ..................... 359/625
5,126,836 A * 6/1992 Um ............................ 348/771
5,787,107 A * 7/1998 Leger et al. .................. 372/71
2001/0017674 A1 * 8/2001 Yamaguchi .................. 349/61

* cited by examiner

*Primary Examiner*—Ricky Mack
*Assistant Examiner*—Omar Hindi
(74) *Attorney, Agent, or Firm*—Oblon, Spivak, McClelland, Maier & Neustadt, P.C.

(57) ABSTRACT

The present invention relates to an optical writing device and an image forming apparatus and method in which the optical writing device is provided. In the optical writing device of the invention, a light source array has an array of light sources emitting a plurality of light beams. A focusing lens array has a row of focusing lens elements focusing the light beams from the light source array onto a surface of a photosensitive medium, the focusing lens elements being arrayed in an array direction, each focusing lens element having a visual field radius X in the array direction and a diameter D in the array direction. The focusing lens array is configured to satisfy the condition: m>2.0 where m is an overlap ratio of each of the focusing lens elements defined by the equation m=X/D.

14 Claims, 18 Drawing Sheets

OPTICAL WRITING DEVICE AND IMAGE FORMING APPARATUS AND METHOD USING THE SAME

BACKGROUND OF THE INVENTION

1. Field of the Invention

The present invention generally relates to an optical writing device for use in an image forming apparatus such as a digital copier, a digital printer or a digital facsimile. More particularly, the present invention relates to an optical writing device in which multiple light beams, emitted by a plurality of light sources of a light source array, are focused onto a surface of a photosensitive medium without deflection. Further, the present invention relates to an image forming apparatus and method in which the optical writing device is used as an exposure unit that exposes the photosensitive medium surface to an imaging light pattern.

2. Description of the Related Art

With the widespread use of image forming systems, such as digital copiers, digital printers and digital facsimiles, there is an increasing demand for a small-size optical writing device for use in image forming systems.

There are two major types of optical writing device: a deflection type and a non-deflection type. In the deflection type, a rotary deflector or the like is provided to deflect the multiple light beams, emitted by a plurality of light sources of a light source array (for example, a semiconductor laser array), and the deflected light beams are focused onto the surface of the photosensitive medium. In the non-deflection type, the light beams, emitted by the light source array, are focused onto the surface of the photosensitive medium without deflection.

The disadvantage of the deflection type is that a total length of the optical path in the optical writing device becomes large because of the use of the rotary deflector, which is not suitable to provide a small-size optical writing device. On the other hand, the non-deflection type does not use a rotary deflector and can shorten the total length of the optical path, and, therefore, it is more suitable to provide a small-size optical writing device. Moreover, the non-deflection type optical writing device does not require mechanical drive parts that move a rotary deflector, and it can provide a low-cost optical writing device.

A conventional optical writing device is known, which is of the non-deflection type and uses a rod lens array as the means for focusing the light beams, emitted by the light source array, onto the photosensitive medium surface. FIG. 31 shows a distribution of light amount of a rod lens array in the conventional optical writing device. FIG. 32 shows a relationship between the rod lens diameter and the visual field radius in the conventional rod lens array of FIG. 31.

As shown in FIG. 31 and FIG. 32, the rod lens array 110 in the conventional optical writing device includes a plurality of rod lens elements 101*a* that focuses the light beams from a light source array onto an image plane. These rod lens elements 101*a* are arrayed in a row in an array direction. Each of the rod lens elements 101*a* has a distribution of light amount due to a distributed refractive index of each rod lens element. Respective images, which are formed on the image plane by the light beams passed through the rod lens elements 101*a* are overlapped each other in the array direction so as to form a line-shaped image. As the light amount distributions of the respective lens elements are superimposed, the distribution of light amount of the conventional rod lens array 101 in the array direction of the rod lens elements 101*a* is as shown in FIG. 31. For this reason, the light amount distribution of the conventional rod lens array is liable to the periodic variations of light amount which depend on the visual field radius of each rod lens element and the pitch of the rod lens elements in the array direction. The magnitude ΔE of the periodic variations of the light amount, caused by the conventional rod lens array 101, is represented by the following formula:

$$\Delta E=(E\max-E\min)/E\max\times 100\ (\%) \quad (1)$$

where Emin is the minimum light amount in the superimposed distribution and Emax is the maximum light amount in the superimposed distribution. In FIG. 32, "D" indicates the rod lens diameter and "X" indicates the visual field radius in the conventional rod lens array 101 of FIG. 31.

Generally, the periodic variations of light amount in the conventional optical writing device depend on the visual field radius of each rod lens element and the pitch of the rod lens elements in the array direction. Herein, it is assumed that the conventional rod lens array is constituted by identical rod lens elements which are arrayed in a row in the array direction, and that all of respective pitches of two adjacent ones of the individual rod lens elements in the array direction are nearly equal to the diameter of each rod lens element in the array direction. Further, it is assumed that the conventional rod lens array includes only the rod lens elements and does not include shading portions between the rod lens elements. Typically, in the conventional optical writing devices, the visual field radius X of each rod lens element in the array direction is on the order of 1 to 2 mm, and the diameter D of each rod lens element in the array direction is approximately 1 mm. Specifically, in the example of the conventional rod lens array 101 of FIG. 32, D=1 mm, X=1.5 mm.

Japanese Laid-Open Patent Application No.10-309826 discloses an optical writing device that uses a semiconductor laser array as a light source array for emitting multiple light beams. The semiconductor laser array used by this conventional device is, for example, an array of light emitting diodes (LED).

In the conventional device of the above document, a rod lens array is provided for focusing the light beams, emitted by the LED array, onto the photosensitive medium surface. In the rod lens array, the rod lens elements are arrayed in two rows in the array direction, and the lens elements of one row are spaced apart from the lens elements of the other row by a given pitch.

Hereinafter, throughout the specification, in order to represent a configuration of a focusing lens array, such as a rod lens array, an overlap ratio m is used, which is defined by the equation m=X/D where X indicates the visual field radius of each focusing lens element in the array direction and D indicates the diameter of each focusing lens element in the array direction.

In the conventional optical writing device of the above document, an overlap ratio m of each rod lens element of the rod lens array is defined by the equation m=X0/D where X0 indicates the visual field radius of each of the rod lens elements in the array direction and D indicates the diameter of each of the rod lens elements in the array direction. The conventional device of the above document is characterized in that the rod lens array is configured such that the overlap ratio m of the rod lens array satisfies the conditions 1.85<m<2.00. This configuration is selected by the conventional device in order to eliminate the undesired variations of the sub-scanning direction alignment of the light source array and the rod lens array.

However, the conventional device of the above document is liable to having the periodic variations of light amount of the rod lens array due to the configuration of the rod lens elements having a small overlap ratio. It is known from practical experience that the magnitude $\Delta E$ of the periodic variations of the light amount is in a range from 10% to 20%. An image forming apparatus using such optical writing device will produce the periodic variations of photographic density in a reproduced image due to the periodic light amount variations of the rod lens array, and it is difficult for the image forming apparatus to provide the reproduced image with good quality.

SUMMARY OF THE INVENTION

It is an object of the present invention to provide an improved optical writing device in which the above-described problems are eliminated.

Another object of the present invention to provide an improved optical writing device that effectively reduces the periodic variations of light amount caused by the lens elements of the focusing lens array as in the conventional optical writing device.

Another object of the present invention is to provide an image forming apparatus which uses an optical writing device, the optical writing device being configured to effectively reduce the periodic variations of light amount caused by the lens elements of the focusing lens array as in the conventional optical writing device.

Another object of the present invention is to provide an image forming method which uses an optical writing device, the optical writing device being configured to effectively reduce the periodic variations of light amount caused by the lens elements of the focusing lens array as in the conventional optical writing device.

The above-mentioned objects of the present invention are achieved by an optical writing device comprising: a light source array which has an array of light sources emitting a plurality of light beams; and a focusing lens array which has a row of focusing lens elements focusing the light beams from the light source array onto a surface of a photosensitive medium, the focusing lens elements being arrayed in an array direction, each focusing lens element having a visual field radius X in the array direction and a diameter D in the array direction, wherein the focusing lens array is configured to satisfy the condition: $m>2.0$ where m is an overlap ratio of each of the focusing lens elements defined by the equation $m=X/D$.

The above-mentioned objects of the present invention are achieved by an optical writing device comprising: a light source array which has an array of light sources emitting a plurality of light beams; a focusing lens array which has a row of focusing lens elements focusing the light beams from the light source array onto a surface of a photosensitive medium, the focusing lens elements being arrayed in an array direction, each focusing lens element having a visual field radius X' in the array direction and an aperture diameter d in the array direction; and a plurality of shading portions which are disposed between the focusing lens elements of the focusing lens array, wherein the focusing lens array is configured to satisfy the condition: $m'>2.0$ where m' is an overlap ratio of each of the focusing lens elements defined by the equation $m'=X'/d$.

The above-mentioned objects of the present invention are achieved by an optical writing device comprising: a light source array which has an array of light sources emitting a plurality of light beams; and a focusing lens array which has a plurality of rows of focusing lens elements focusing the light beams from the light source array onto a surface of a photosensitive medium, the focusing lens elements being arrayed in an array direction, each focusing lens element having a visual field radius X in the array direction and a diameter D in the array direction, wherein the focusing lens array is configured to satisfy the condition: $m>2.0$ where m is an overlap ratio of each of the focusing lens elements defined by the equation $m=X/D$.

The above-mentioned objects of the present invention are achieved by an image forming apparatus comprising: an optical writing device; and a photosensitive medium which has a surface on which an electrostatic latent image is formed by exposing the surface to light emitted and focused by the optical writing device, wherein the optical writing device comprises: a light source array which has an array of light sources emitting a plurality of light beams; and a focusing lens array which has a row of focusing lens elements focusing the light beams from the light source array onto the surface of the photosensitive medium, the focusing lens elements being arrayed in an array direction, each focusing lens element having a visual field radius X in the array direction and a diameter D in the array direction, wherein the focusing lens array is configured to satisfy the condition: $m>2.0$ where m is an overlap ratio of each of the focusing lens elements defined by the equation $m=X/D$.

The above-mentioned objects of the present invention are achieved by an image forming method which comprises the steps of: providing an optical writing device, the optical writing device comprising a light source array having an array of light sources emitting a plurality of light beams, and a focusing lens array having a row of focusing lens elements focusing the light beams from the light source array onto a surface of a photosensitive medium; controlling the light source array to emit the light beams; and forming an electrostatic latent image on the surface of the photosensitive medium by exposing the photosensitive medium surface to the light beams focused by the focusing lens array, wherein the focusing lens elements of the optical writing device are arrayed in an array direction, each focusing lens element having a visual field radius X in the array direction and a diameter D in the array direction, wherein the optical writing device is configured to satisfy the condition: $m>2.0$ where m is an overlap ratio of each of the focusing lens elements defined by the equation $m=X/D$.

In the optical writing device of the present invention, the focusing lens array is configured to satisfy the condition: $m>2.0$ where m is an overlap ratio of each of the focusing lens elements defined by the equation $m=X/D$, X indicates the visual field radius of each focusing lens element in the array direction, and D indicates the diameter of each focusing lens element in the array direction. Therefore, the optical writing device of the present invention is effective in reducing the periodic variations of light amount caused by the focusing lens elements of the conventional optical writing device.

In the image forming apparatus and method of the present invention, the optical writing device in which the focusing lens array is configured to satisfy the condition: $m>2.0$ is provided. As the periodic variations of light amount, caused by the focusing lens elements of the conventional optical writing device, are eliminated, the image forming apparatus and method of the present invention can create a reproduced image with good quality and eliminate the periodic variations of photographic density in the reproduced image.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will be given of preferred embodiments of the optical writing device and the image forming apparatus of the present invention with reference to the accompanying drawings.

Figure 1:
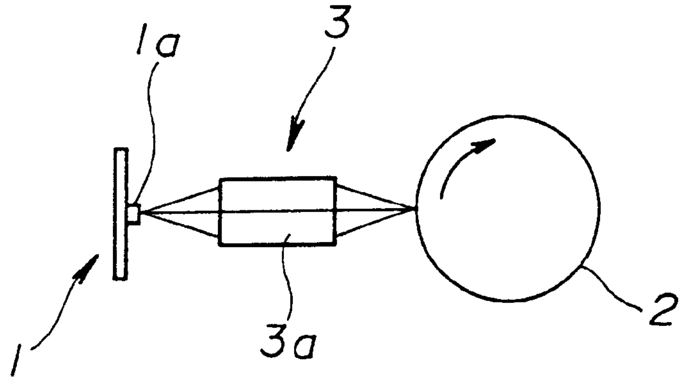
FIG. 1 is a diagram of a first preferred embodiment of the optical writing device of the present invention.
Figure 2:
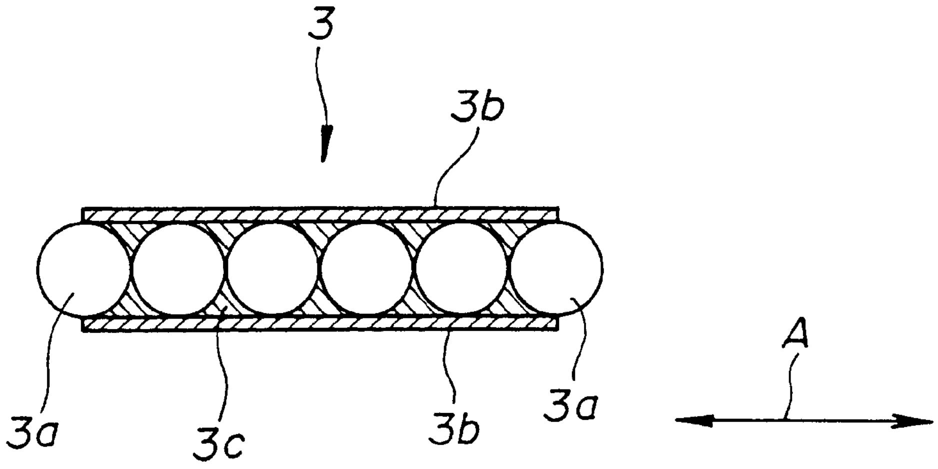
FIG. 2 is a cross-sectional view of a rod lens array in the optical writing device of FIG. 1.

FIG. 1 shows a first preferred embodiment of the optical writing device of the present invention. FIG. 2 is a cross-sectional view of a rod lens array 3 in the optical writing device of FIG. 1.

As shown in FIG. 1, in the optical writing device of the present embodiment, a light source array 1 and a focusing lens array 3 are provided. The light source array 1 in this embodiment is an LED (light emitting diode) array which has an array of light emitting diodes 1*a* that emit multiple light beams. The focusing lens array 3 in this embodiment is a rod lens array having a row of rod lens elements 3*a* that focuses the light beams, emitted by the light emitting diodes 1*a* of the LED array 1, onto a surface of a photosensitive medium 2. In the rod lens array 3, the rod lens elements 3*a* are arrayed in an array direction (perpendicular to the plane of FIG. 1), and each of the rod lens elements 3*a* has a visual field radius X in the array direction (indicated by the arrow A in FIG. 2) and a diameter D in the array direction A. The optical writing device of the present embodiment is characterized by the rod lens array 3 that is configured to satisfy the condition: $m>2.0$ where m is an overlap ratio of each rod lens element 3*a* defined by the equation $m=X/D$.

In the above-described embodiment, the LED array 1 is configured to have the plurality of light emitting diodes 1*a* that are arrayed in a row. Alternatively, the light source array 1 in the optical writing device of the invention may be configured to have the plurality of light emitting diodes la that are arrayed in a number of rows (two or more rows). Alternatively, the light source array 1 in the optical writing device of the invention may be configured into a halogen lamp type having an array of liquid crystal shutters provided in front of an elongated halogen lamp, and the liquid crystal shutters are arrayed along an axial line of the halogen lamp in the array direction.

In the above-described embodiment, the LED array 1 is controlled such that the light emitting diodes 1*a* are individually turned on or off to emit the multiple light beams in accordance with imaging information. In a case of the halogen lamp type, the liquid crystal shutters are individually turned on or off such that the light emitted by the halogen lamp is passed through or closed off by the respective shutters.

As shown in FIG. 2, the rod lens array 3 is configured to have the rod lens elements 3*a* that are arrayed in a row in the array direction A, a pair of retainer plates 3*b*, and an opaque resin material 3*c*. The retainer plates 3*b* retain the row of the rod lens elements 3*a*. The internal spaces of the rod lens array 3 between the retainer plates 3*b* which the rod lens elements 3*a* do not occupy are filled with the opaque resin material 3*c*, in order to shade each rod element 3*a* from the flaring light from the adjacent rod lens element 3*a*.

Figure 3:
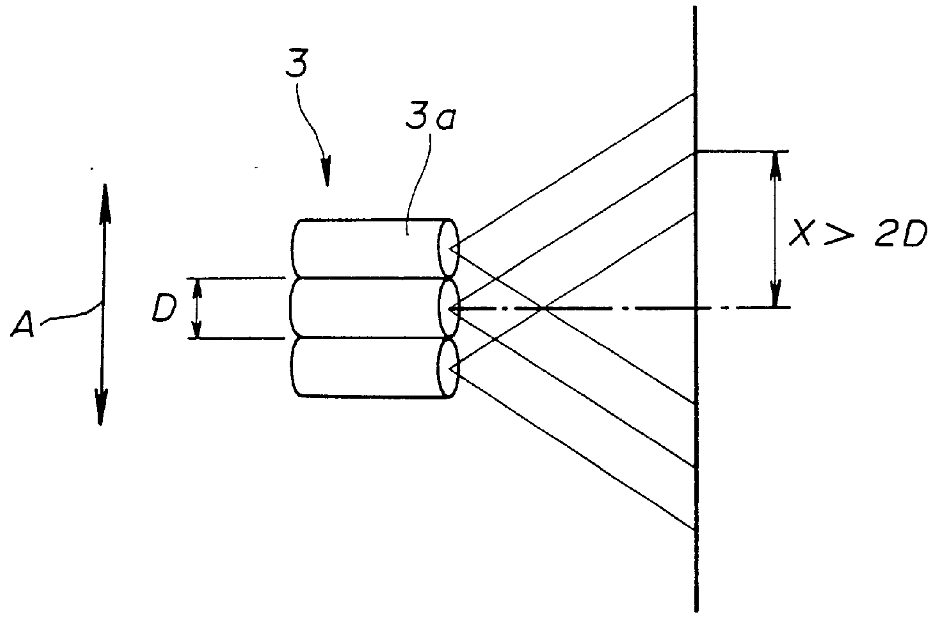
FIG. 3 is a diagram for explaining a relationship between the rod lens diameter and the visual field radius in the rod lens array of FIG. 1.

FIG. 3 shows a relationship between the rod lens element diameter D and the visual field radius X in the rod lens array 3 of FIG. 1. As shown in FIG. 3, each of the rod lens elements 3*a* of the rod lens array 3 is substantially in the form of a cylinder. The diameter D of each of the rod lens elements 3*a* of the rod lens array 3 in the array direction A is essentially the same as the diameter of the cylinder. In the present embodiment, the visual field radius X of each of the rod lens elements 3*a* of the rod lens array 3 in the array direction must satisfy the condition X>2D. In the present embodiment, because the optical specifications of each rod lens element 3*a* of the rod lens array 3 are predetermined so as to meet the condition X>2D, the rod lens array 3 of FIG. 1 is configured to satisfy the condition: m=X/D>2.0.

Figure 4:
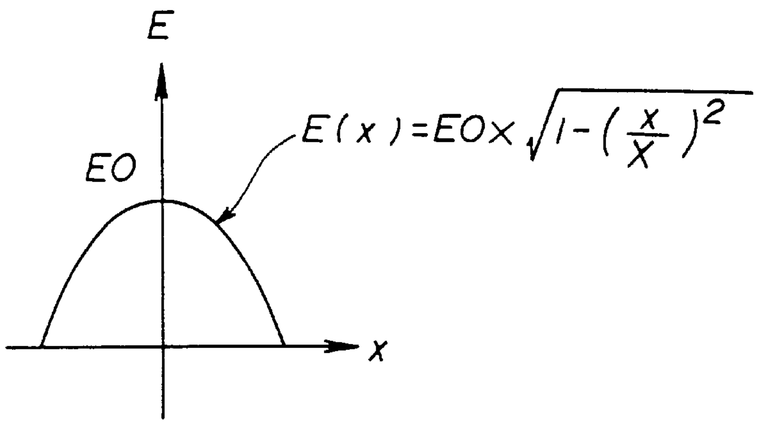
FIG. 4 is a diagram for explaining a distribution of light amount of a single lens element in the rod lens array of FIG. 1.

Generally, a light amount distribution E(x) of a single lens element in the rod lens array is represented by the following formula:

$$E(x)=Eo\cdot\sqrt{[1-(x/X)^2]} \qquad (2)$$

where "x" indicates a distance from the optical axis of the rod lens element, "Eo" indicates a value of the light amount distribution E(x) at x=0 (the optical axis), and "X" indicates the visual field radius of the rod lens element as indicated in FIG. 3. FIG. 4 shows a curve of the light amount distribution of the rod lens element represented by the above formula (2). As shown in FIG. 4, the light amount E(x) of the rod lens element is the maximum (=Eo) at the optical axis (x=0), and the light amount E(x) is gradually decreased from the maximum as the distance from the optical axis in the array direction is increased.

Figure 5:
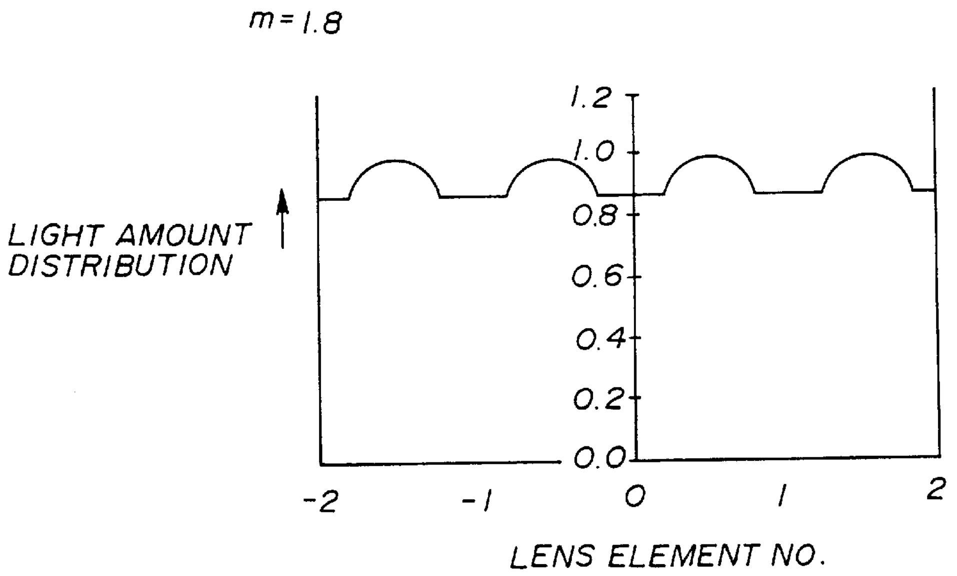
FIG. 5 PRIOR ART
FIG. 5 is a diagram for explaining a light amount distribution of a conventional rod lens array.

For the purpose of comparison, FIG. 5 shows a light amount distribution of a conventional rod lens array.

In the conventional rod lens array of FIG. 5, a plurality of rod lens elements are arrayed in a row in the array direction, and the diameter of each rod lens element in the array direction is 1 mm (D=1 mm). The conventional rod lens array is configured to satisfy the overlap ratio condition m=1.8. In FIG. 5, the lens element number ("LENS ELEMENT NO.") on the lateral axis indicates a position of the optical axis of the "i"th lens element in the rod lens array. The magnitude of light amount of each lens element on the longitudinal axis of FIG. 5 is normalized by the maximum light amount of the lens element. According to the above formula (1), the magnitude ΔE of the periodic variations of the light amount of this conventional rod lens array is 13%.

Figure 6:
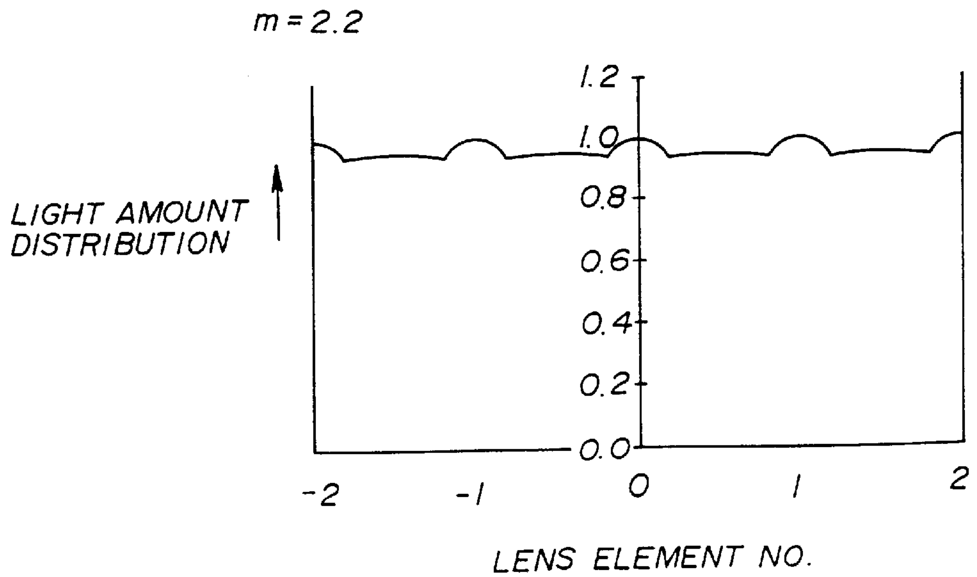
FIG. 6 is a diagram for explaining a light amount distribution of a first example of the rod lens array in the optical writing device of FIG. 1.
Figure 7:
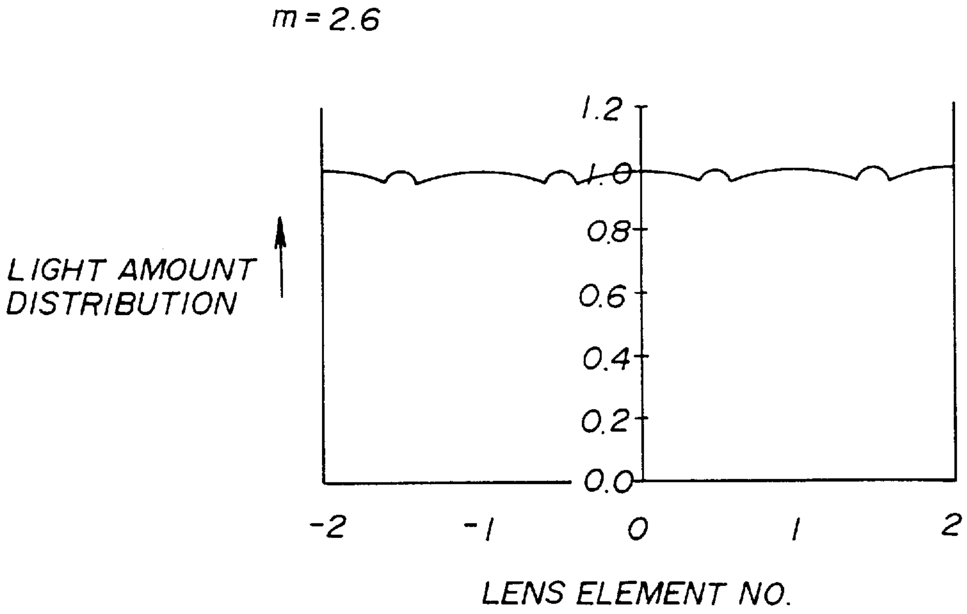
FIG. 7 is a diagram for explaining a light amount distribution of a second example of the rod lens array in the optical writing device of FIG. 1.
Figure 8:
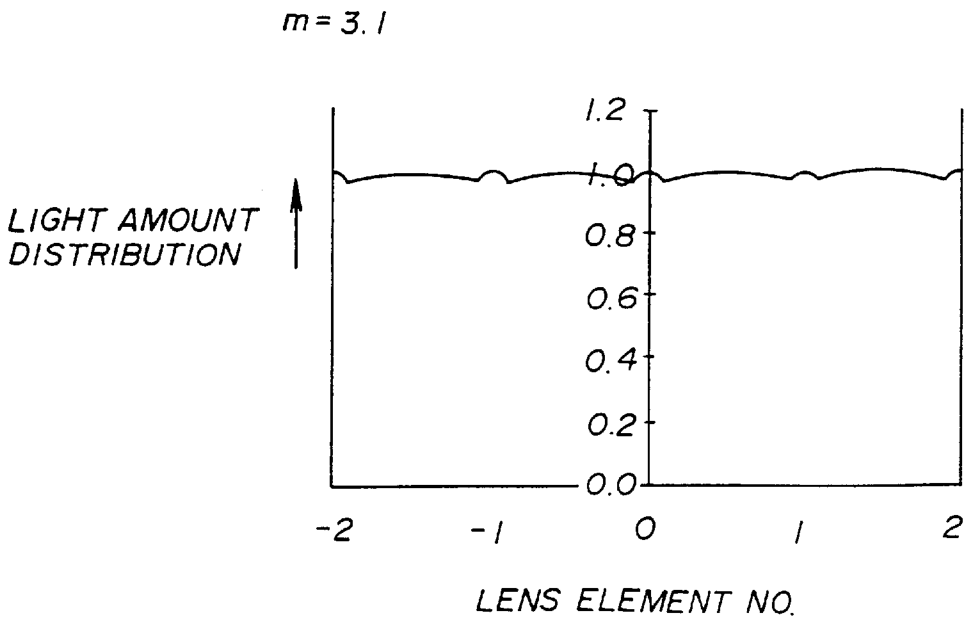
FIG. 8 is a diagram for explaining a light amount distribution of a third example of the rod lens array in the optical writing device of FIG. 1.

On the other hand, the light amount distribution of the rod lens array 3 in the first preferred embodiment of the optical writing device shown in FIG. 1 will be explained. FIG. 6, FIG. 7 and FIG. 8 show respective light amount distributions of first, second and third examples of the rod lens array 3 in FIG. 1.

In each of the first, second and third examples of the rod lens array 3 of FIG. 1, a plurality of rod lens elements are arrayed in a row in the array direction, and the diameter of each rod lens element in the array direction is 1 mm (D=1 mm). The first example (FIG. 6) of the rod lens array 3 is configured to satisfy the overlap ratio condition m=2.2. The second example (FIG. 7) of the rod lens array 3 is configured to satisfy the overlap ratio condition m=2.6. The third example (FIG. 8) of the rod lens array 3 is configured to satisfy the overlap ratio condition m=3.1.

In FIG. 6 through FIG. 8, the lens element number on the lateral axis indicates a position of the optical axis of the "i"th lens element in the rod lens array 3. The magnitude of the light amount of the rod lens array on the longitudinal axis is normalized by the maximum light amount of the lens element. According to the above formula (1), the magnitude ΔE of the periodic variations of the light amount of the first example is 8%, the magnitude ΔE of the periodic variations of the light amount of the second example is 4%, and the magnitude ΔE of the periodic variations of the light amount of the first example is 3%.

As shown in FIG. 6 through FIG. 8, it is ascertained that the periodic variations of the light amount of the conventional rod lens array of FIG. 5 are effectively reduced by the configuration of the rod lens array 3 in the first preferred embodiment. In order for the image forming apparatus to create a reproduced image with good quality, it is desirable to reduce the magnitude ΔE of the period variations of the light amount of the rod lens array to 3% or less. To attain the goal, it is necessary to configure the rod lens array of the optical writing device to satisfy the overlap ratio condition: m=X/D>3.0.

Next, a description will be given of a second preferred embodiment of the optical writing device of the invention.

Figure 9:
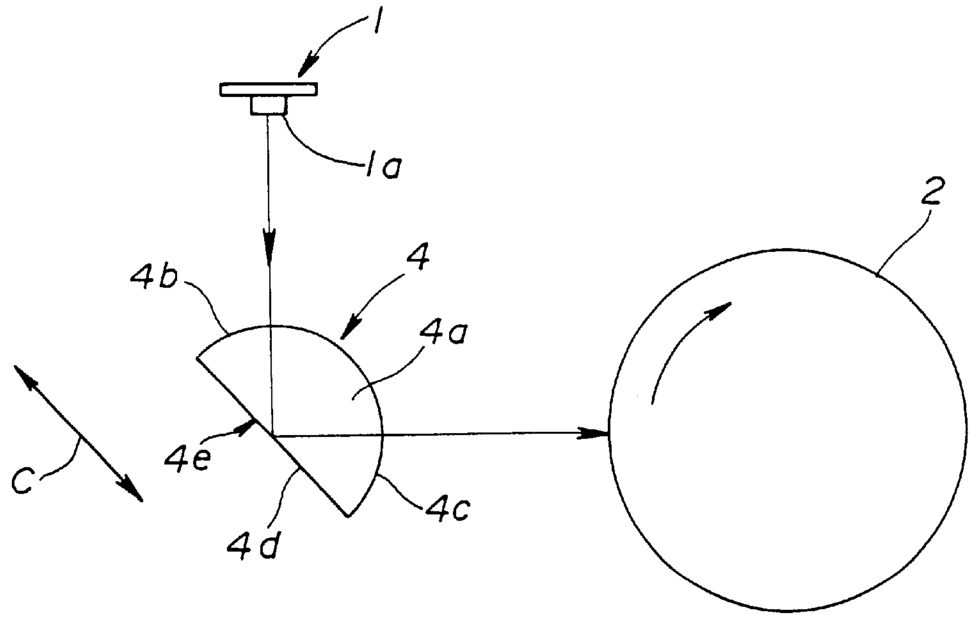
FIG. 9 is a diagram of a second preferred embodiment of the optical writing device of the present invention.
Figure 10:
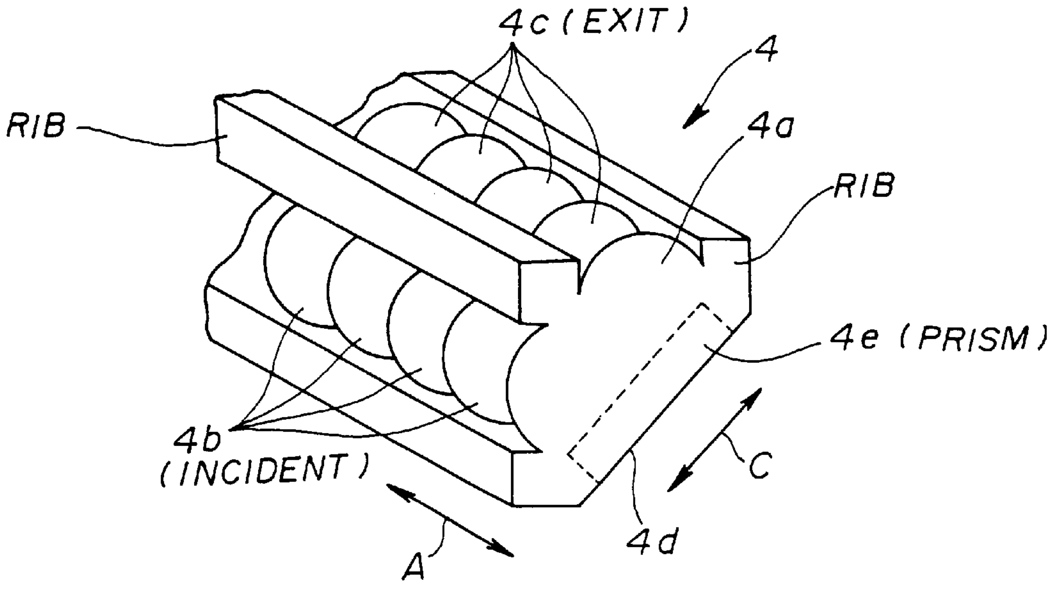
FIG. 10 is a perspective view of a roof prism lens array in the optical writing device of FIG. 9.
Figure 11:
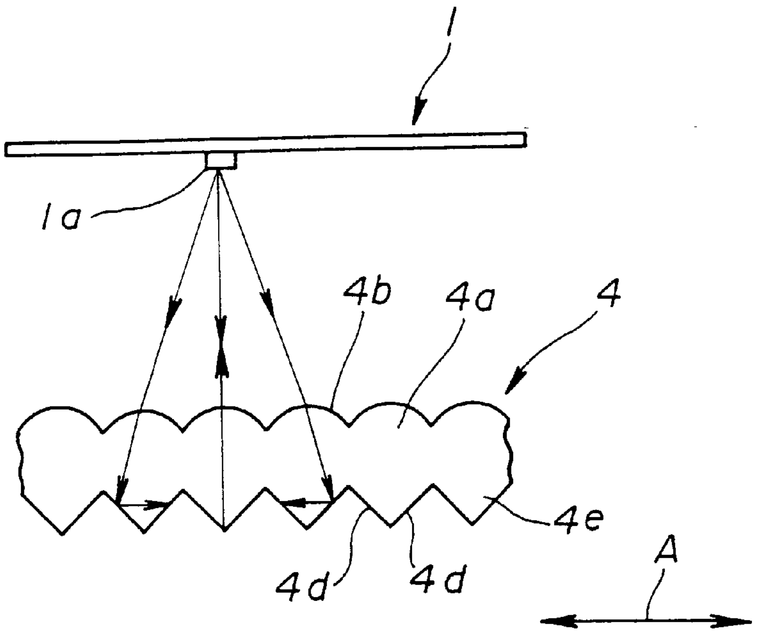
FIG. 11 is a diagram for explaining a configuration of the roof prism lens array in the optical writing device of FIG. 9.

FIG. 9 shows the second preferred embodiment of the optical writing device. FIG. 10 is a perspective view of a roof prism lens array 4 in the optical writing device of FIG. 9. FIG. 11 shows a configuration of the roof prism lens array 4 in the optical writing device of FIG. 9.

As shown in FIG. 9, in the optical writing device of the present embodiment, the light source array 1 and a focusing lens array 4 are provided. The light source array 1 in this embodiment is essentially the same as the LED (light emitting diode) array of FIG. 1. The array of light emitting diodes 1*a* of the LED array 1 emit the multiple light beams. The focusing lens array 4 in this embodiment is a roof prism lens array having a row of roof prism lens elements 4*a* that focuses the light beams, emitted by the light emitting diodes 1*a* of the LED array 1, onto the surface of the photosensitive medium 2.

As shown in FIG. 10, in the roof prism lens array 4, the roof prism lens elements 4*a* are arrayed in an array direction (indicated by the arrow "A" in FIG. 10). Each of the roof prism lens elements 4*a* has a visual field radius X in the array direction A and a diameter D in the array direction A. The optical writing device of the present embodiment is characterized by the roof prism lens array 4 that is configured to satisfy the condition: m>2.0 where m is an overlap ratio of each roof prism lens element 4*a* defined by the equation m=X/D.

As shown in FIG. 10 and FIG. 11, the roof prism lens array 4 is configured to have the roof prism lens elements 4*a* arrayed in the array direction A. Unlike the rod lens array 3 of the previous embodiment, all the roof prism lens elements 4*a* of the roof prism lens array 4 are formed as an integral part through an injection molding process using a resin material. In order to reinforce the roof prism lens array 4, three ribs that extend in the array direction A are provided. Each roof prism lens element 4*a* generally includes an incident surface 4*b*, an exit surface 4*c* and a V-shaped prism portion 4*e*. One of the light beams from the light source array 1 is incident to the incident surface 4*b* of each roof prism lens element 4*a*. One of the focused light beams goes out of the exit surface 4*c* of each roof prism lens element 4*a* to the photosensitive medium surface. The V-shaped prism portion 4*e* includes two orthogonal total reflection surfaces 4*d* which are both slanted at 45 degrees to the axis of the incident light beam and extending in a direction, indicated by the arrow C in FIG. 10, which is perpendicular to the array direction A. The total reflection surfaces 4*d* of the prism portion 4*e* reflect the light beam from the incident surface 4*b* to the exit surface 4*c*. As shown in FIG. 11, the total reflection surfaces 4*d* are slanted at 45 degrees to the axis of the incident light beam from the light source array 1.

In the roof prism lens array 4 of the present embodiment, erect images, which are formed on the image plane by the light beams passed through the roof prism lens elements 4*a* are overlapped each other in the array direction A so as to form a line-shaped image on the image plane.

Figure 12:
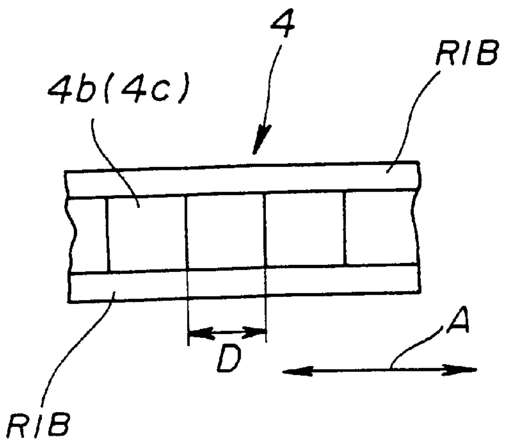
FIG. 12 is a diagram for explaining a configuration of the roof prism lens array of FIG. 10.

FIG. 12 shows a configuration of the roof prism lens array 4 of FIG. 10. A schematic diagram of the roof prism lens array 4 when viewed from the direction of the optical axis of each roof prism lens element 4*a* is shown in FIG. 12. As shown in FIG. 12, both the incident surface 4*b* and the exit surface 4*c* of each of the roof prism lens elements 4*a* in the lens array 4 have an aperture in a generally rectangular configuration. The diameter D of each of the roof prism lens elements 4*a* of the roof prism lens array 4 in the array direction A is essentially the same as the length of one side of the rectangle. In the present embodiment, the area of the aperture of each roof prism lens element 4*a* can be increased from that of each rod lens element 3*a* of the rod lens array 3, and the efficiency of light propagation of the roof prism lens array 4 can be increased.

Figure 13:
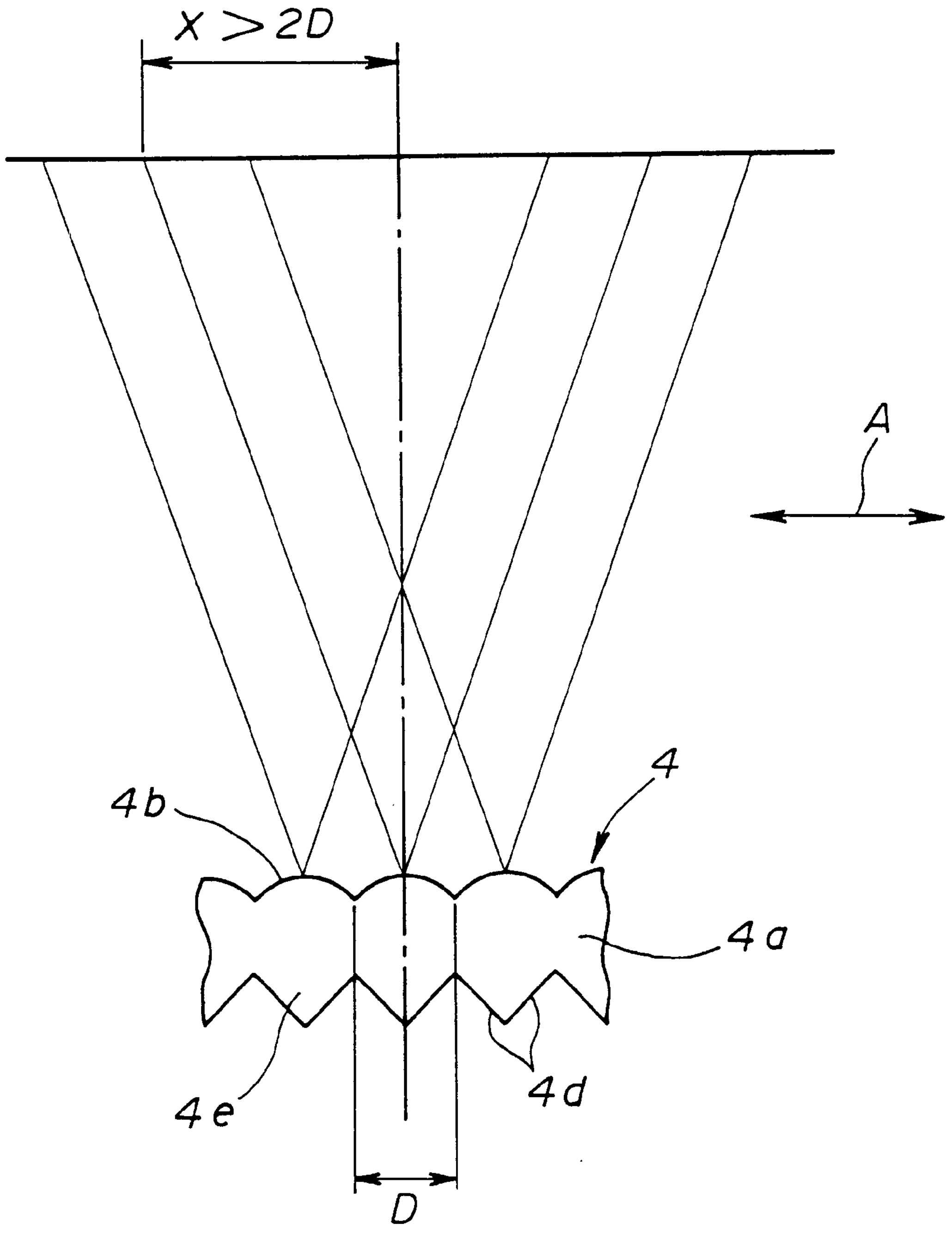
FIG. 13 is a diagram for explaining a relationship between the roof lens diameter and the visual field radius in the roof prism lens array of FIG. 10.

FIG. 13 shows a relationship between the roof lens diameter D and the visual field radius X in the roof prism lens array 4 of FIG. 10. As shown in FIG. 13, the visual field radius X of each of the roof prism lens elements 4*a* of the roof prism lens array 4 in the array direction A must satisfy the condition X>2D. In the present embodiment, because the optical specifications of each roof prism lens element 4*a* of the roof prism lens array 4 are predetermined so as to meet the condition X>2D, the roof prism lens array 4 of FIG. 9 is configured to satisfy the condition: m=X/D>2.0.

Figure 14:
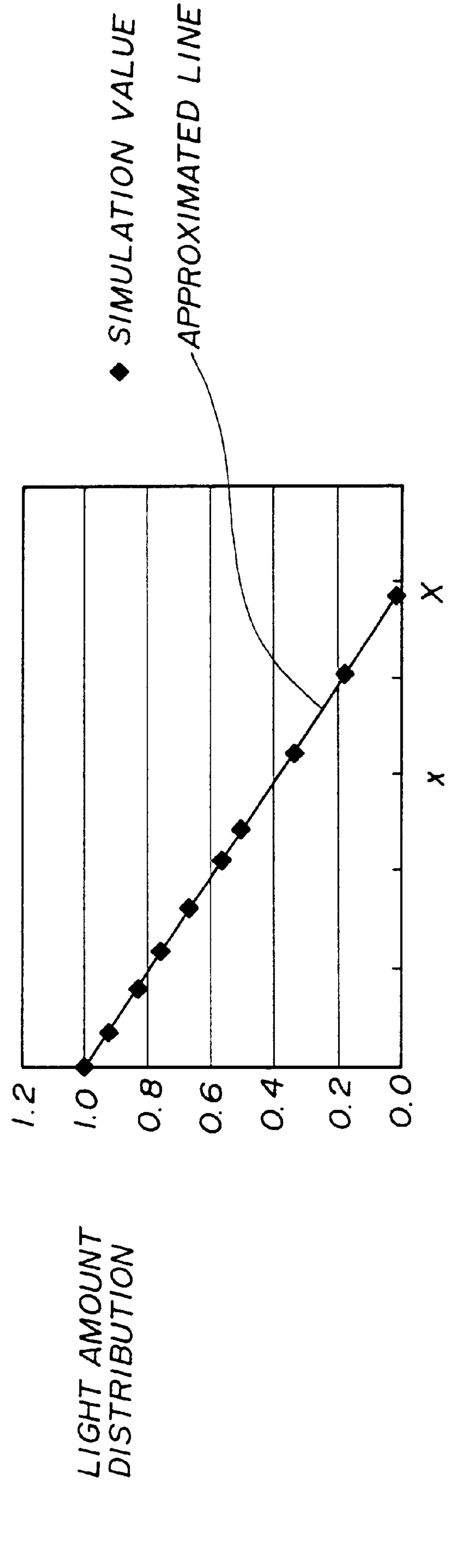
FIG. 14 is a diagram for explaining simulation results of a light amount distribution of a single lens element of the roof prism lens array in the optical writing device of FIG. 9.

In the present embodiment, in order to examine a light amount distribution of the roof prism lens element 4*a*, simulation tests are performed. FIG. 14 shows simulation results of the light amount distribution of a single lens element of the roof prism lens array 4 in the optical writing device of FIG. 9.

In FIG. 14, the black rhombus dots indicate the simulation values of the light amount distribution, the solid line indicates an approximated line for the simulations values, "x" indicates a distance from the optical axis of the roof prism lens element 4*a*, and "X" indicates the visual field radius of the roof prism lens element 4*a* as shown in FIG. 13. In the simulation results of FIG. 14, the maximum light amount of the roof prism lens element 4*a* at x=0 (the optical axis) is equal to 1.0. In other words, the simulation results of the light amount distribution are normalized by the maximum light amount at the optical axis.

Figure 15:
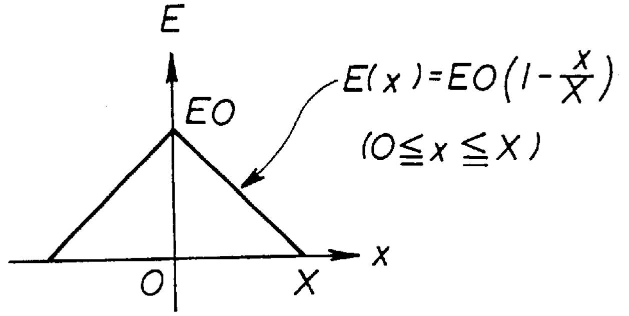
FIG. 15 is a diagram for explaining a light amount distribution of a single lens element of the roof prism lens array in the optical writing device of FIG. 9.
Figure 16:
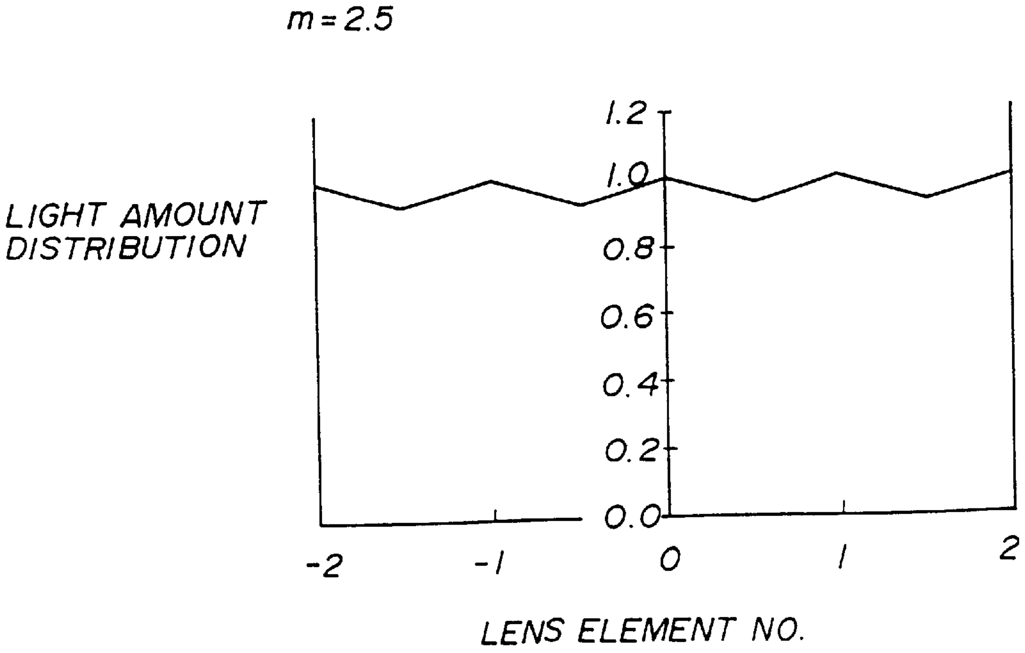
FIG. 16 is a diagram for explaining a light amount distribution of a first example of the roof prism lens array in the optical writing device of FIG. 9.
Figure 17:
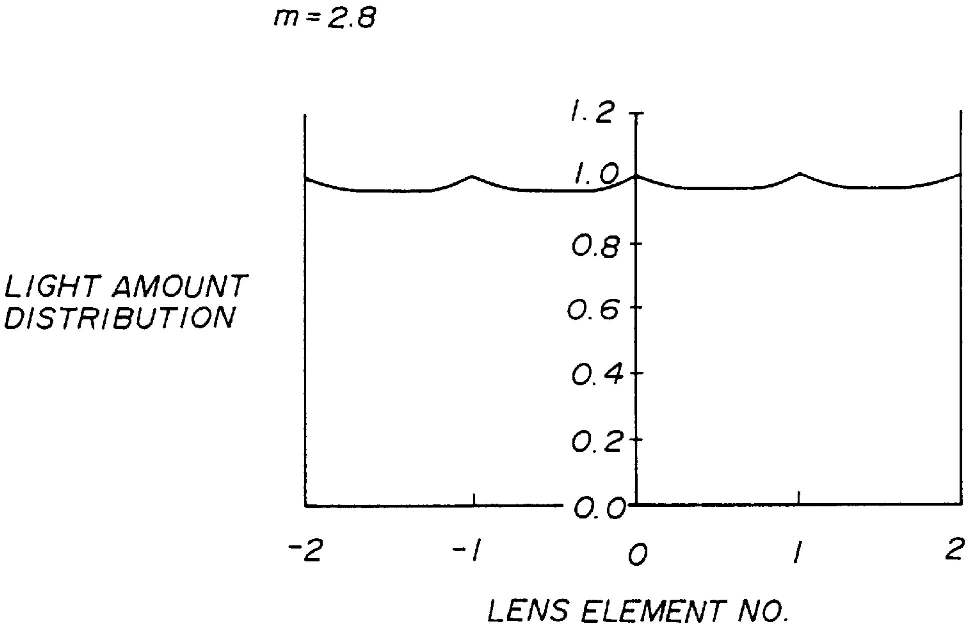
FIG. 17 is a diagram for explaining a light amount distribution of a second example of the roof prism lens array in the optical writing device of FIG. 9.
Figure 18:
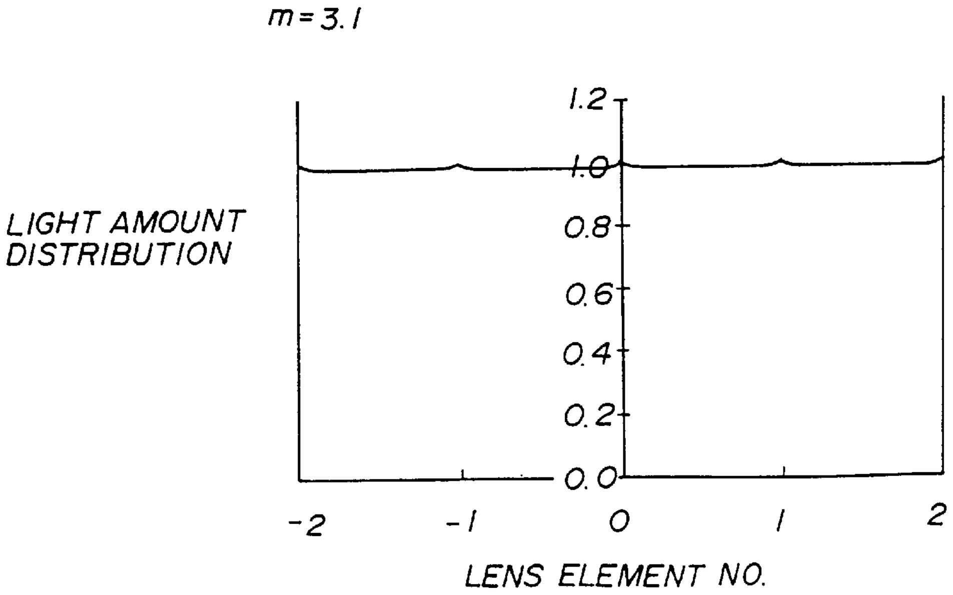
FIG. 18 is a diagram for explaining a light amount distribution of a third example of the roof prism lens array in the optical writing device of FIG. 9.
Figure 19:
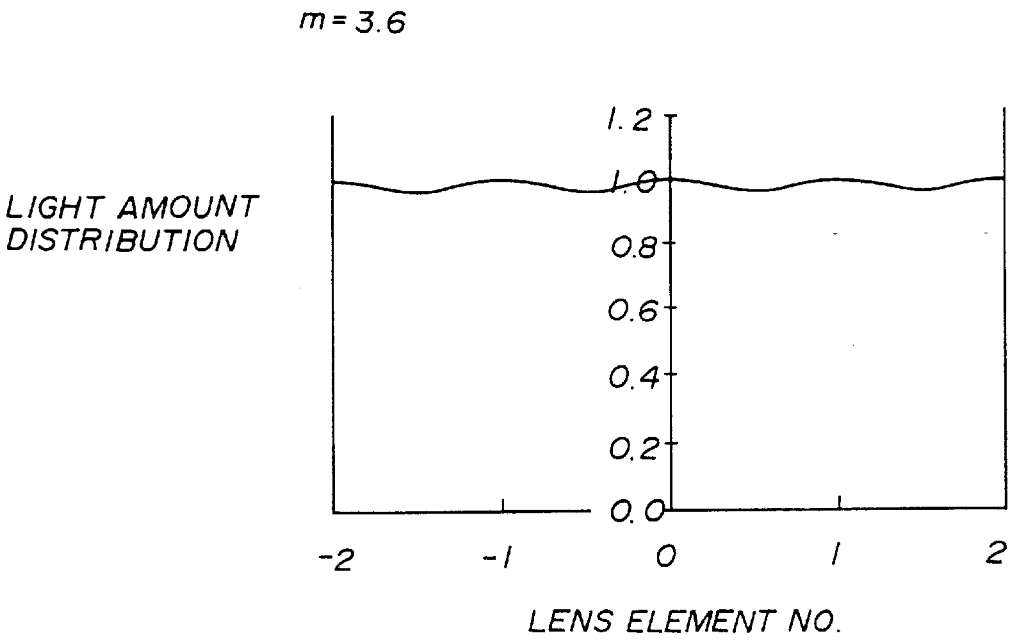
FIG. 19 is a diagram for explaining a light amount distribution of a fourth example of the roof prism lens array in the optical writing device of FIG. 9.
Figure 20:
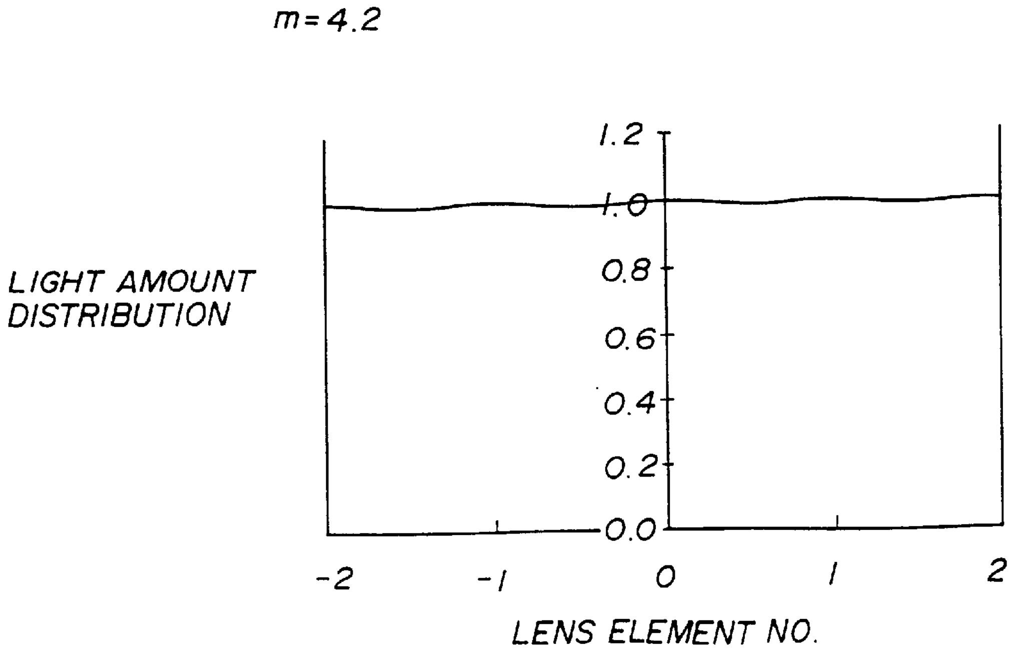
FIG. 20 is a diagram for explaining a light amount distribution of a fifth example of the roof prism lens array in the optical writing device of FIG. 9.

FIG. 15 shows an approximated line of the light amount distribution of a single lens element of the roof prism lens array 4 in the optical writing device of FIG. 9.

As shown in FIG. 15, the approximated line of the light amount distribution is represented by the equations:

$$E(x)=Eo(1+x/X)(-X<x<0)$$

$$E(x)=Eo(1-x/X)(0<x<X).$$

Hence, the light amount E(x) of the roof prism lens element 4*a* is the maximum (=Eo) at the optical axis (x=0), and the light amount E(x) is linearly decreased from the maximum (=Eo) as the distance from the optical axis in the array direction is increased. In the present embodiment, the light amount distribution of the roof prism lens array 4 is represented based on the approximated light amount distribution as shown in FIG. 15.

The light amount distribution of the roof prism lens array 4 in the second preferred embodiment of the optical writing device will now be explained. FIG. 16, FIG. 17, FIG. 18, FIG. 19 and FIG. 20 show respective light amount distributions of first, second, third, fourth and fifth examples of the roof prism lens array 4 of FIG. 9.

In each of these examples of the roof prism lens array 4 of FIG. 9, a plurality of roof prism lens elements 4*a* are arrayed in the array direction A, and the visual field radius X of each roof prism lens element 4*a* in the array direction A is 2.5 mm (X=2.5 mm).

The first example (FIG. 16) of the roof prism lens array 4 is configured such that the diameter D of the lens element 4*a* in the array direction A is equal to 1.0 mm (D=1.0 mm) and the overlap ratio condition: m=2.5 is satisfied.

The second example (FIG. 17) of the roof prism lens array 4 is configured such that the diameter D of the lens element 4*a* in the array direction A is equal to 0.9 mm (D=0.9 mm) and the overlap ratio condition: m=2.8 is satisfied.

The third example (FIG. 18) of the roof prism lens array 4 is configured such that the diameter D of the lens element 4*a* in the array direction A is equal to 0.8 mm (D=0.8 mm) and the overlap ratio condition: m=3.1 is satisfied.

The fourth example (FIG. 19) of the roof prism lens array 4 is configured such that the diameter D of the lens element 4*a* in the array direction A is equal to 0.7 mm (D=0.7 mm) and the overlap ratio condition: m=3.6 is satisfied.

The fifth example (FIG. 20) of the roof prism lens array 4 is configured such that the diameter D of the lens element 4*a* in the array direction A is equal to 0.6 mm (D=0.6 mm) and the overlap ratio condition: m=4.2 is satisfied.

In FIG. 16 through FIG. 20, the lens element number on the lateral axis indicates a position of the optical axis of the "i"th lens element in the roof prism lens array 4. The magnitude of light amount of the roof prism lens array on the longitudinal axis is normalized by the maximum light amount of each lens element. According to the above formula (1), the magnitude ΔE of the periodic variations of the light amount of the first example is 8%, the magnitude ΔE of the periodic variations of the light amount of the second example is 3%, the magnitude ΔE of the periodic variations of the light amount of the third example is 1%, the magnitude ΔE of the periodic variations of the light amount of the fourth example is 3%, and the magnitude ΔE of the periodic variations of the light amount of the fifth example is 1%.

As shown in FIG. 16 through FIG. 20, it is ascertained that the periodic variations of the light amount of the conventional lens array (which are on the order of 10% to 20%) are effectively reduced by the configuration of the roof prism lens array 4 in the second preferred embodiment. In order for the image forming apparatus to create a reproduced image with good quality, it is desirable to reduce the magnitude $\Delta E$ of the period variations of the light amount of the rod lens array to 3% or less. To attain the goal, it is necessary to configure the roof prism lens array 4 of the optical writing device to satisfy the overlap ratio condition: m=X/D>3.0.

Further, in the above-described embodiment, it is desirable that the lens element pitch (which is the same as the lens element diameter D) of the roof prism lens array 4 of the optical writing device is below 1 mm. The visual sensitivity that is most perceivable to the human is on the order of 0.5 to 1 cycles/mm, and, if such frequency band is excluded, it is difficult for the human to perceive the periodic variations of photographic density in a reproduced image.

Further, in the above-described embodiment, all the roof prism lens elements 4*a* of the roof prism lens array 4 are formed as an integral part through an injection molding process using a resin material. This means that the volume production of the roof prism lens array 4 is possible, and the manufacturing cost can be lowered. The roof prism lens array 4 of this embodiment provides good integrity of the optical axes of the respective lens elements and ease of the manufacturing processes.

Figure 21:
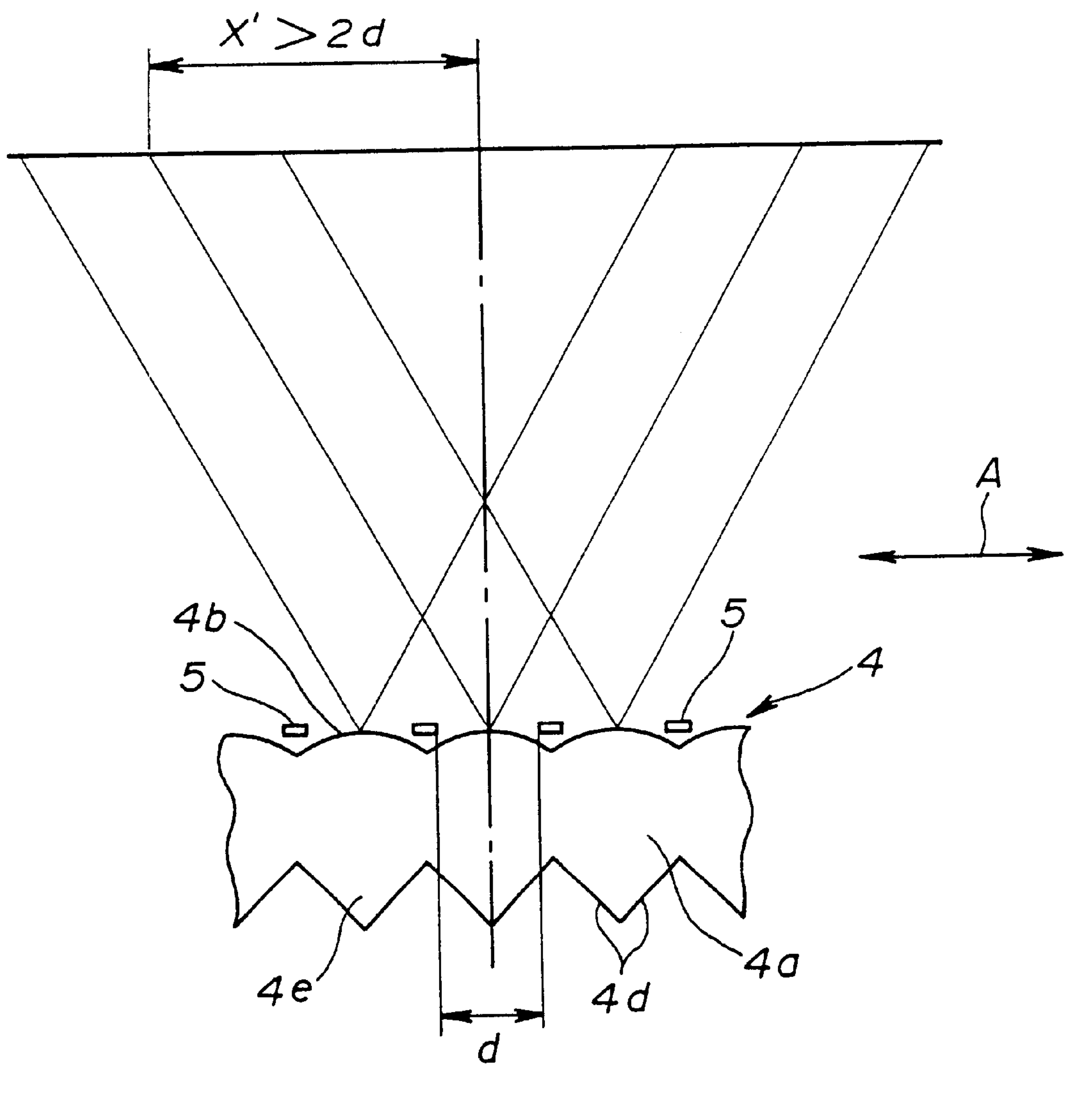
FIG. 21 is a diagram for explaining a relationship between the roof lens diameter and the visual field radius in a third preferred embodiment of the optical writing device of the present invention.

Next, FIG. 21 shows a relationship between the roof lens diameter and the visual field radius in a third preferred embodiment of the optical writing device of the invention.

The optical writing device of the present embodiment is configured in the same manner as the previous embodiment of FIG. 9 except that the optical writing device of the present embodiment further includes a plurality of shading portions 5 disposed between the lens elements of the roof prism lens array 4.

More specifically, in the optical writing device of the present embodiment, the light source array 1, the roof prism lens array 4 and the shading portions 5 are provided. The light source array 1 in this embodiment is essentially the same as the LED (light emitting diode) array of FIG. 1. The array of light emitting diodes 1*a* of the LED array 1 emit the multiple light beams. The roof prism lens array 4 in this embodiment is essentially the same as the roof prism lens array 4 of FIG. 9. The roof prism lens elements 4*a* of the array 4 focuses the light beams, emitted by the light emitting diodes 1*a* of the LED array 1, onto the surface of the photosensitive medium 2. Further, the shading portions 5 are disposed between the lens elements of the roof prism lens array 4. The shading portions 5 serve to shade each roof prism lens element 4*a* from the flaring light from the adjacent lens element 4*a*.

As shown in FIG. 21, in the roof prism lens array 4, the roof prism lens elements 4*a* are arrayed in the array direction indicated by the arrow "A" in FIG. 21. Each of the roof prism lens elements 4*a* has a visual field radius X' in the array direction A and an aperture diameter d in the array direction A. The optical writing device of the present embodiment is characterized by the roof prism lens array 4 that is configured to satisfy the condition: m'>2.0 where m' is an overlap ratio of each roof prism lens element 4*a* defined by the equation m'=X'/d.

In the previous embodiment of FIG. 13, the lens element diameter D in the array direction is equal to the array pitch P of the roof prism lens array 4 in the array direction (D=P). However, in the present embodiment, because of the use of the shading portions 5, the aperture diameter d in the array direction is slightly smaller than the lens element diameter D (d<D) as shown in FIG. 21. Further, the visual field radius X' in the array direction for the present embodiment is slightly smaller than the visual field radius X for the previous embodiment (X'<X).

As shown in FIG. 21, the visual field radius X' of each of the roof prism lens elements 4*a* of the roof prism lens array 4 in the array direction A must satisfy the condition X'>2d. In the present embodiment, because the optical specifications of each roof prism lens element 4*a* of the roof prism lens array 4 are predetermined so as to meet the condition X'>2d, the roof prism lens array 4 of FIG. 21 is configured to satisfy the condition: m'=X'/d>2.0.

Figure 22:
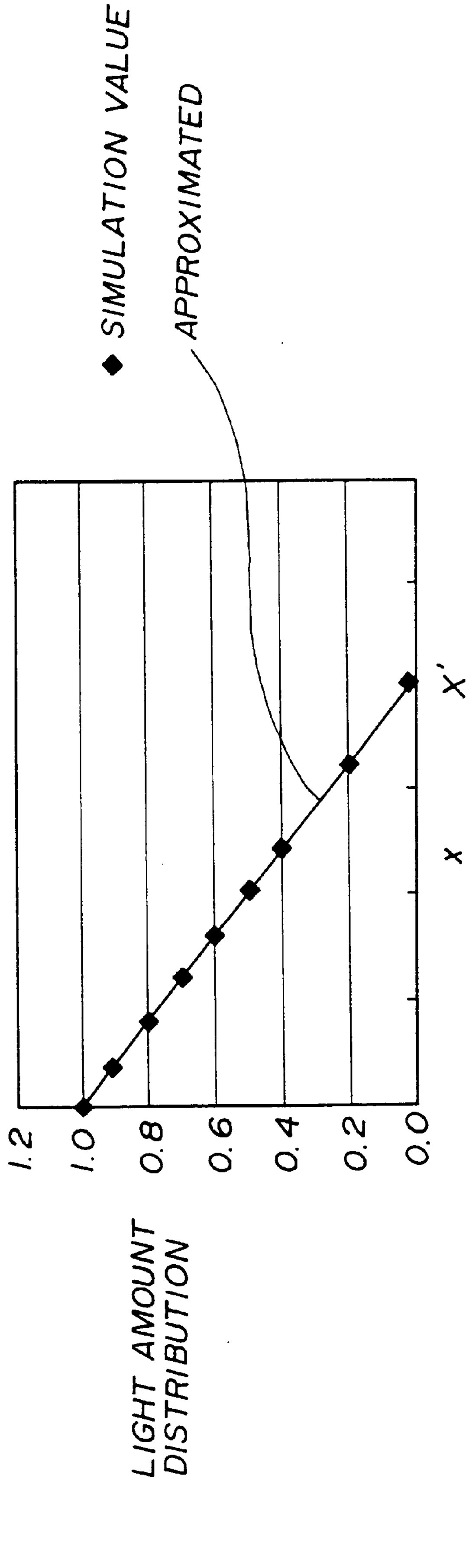
FIG. 22 is a diagram for explaining simulation results of a light amount distribution of a single lens element of the roof prism lens array of FIG. 21.

In the present embodiment, in order to examine a light amount distribution of the roof prism lens element 4*a*, simulation tests are performed. FIG. 22 shows simulation results of the light amount distribution of a single lens element of the roof prism lens array 4 of FIG. 21. Specifically, the simulation tests are performed for the roof prism lens array 4 on which the shading portions 5 are disposed such that the aperture diameter d of each roof prism lens element 4*a* is equal to 0.8D (d=0.8D).

In FIG. 22, the black rhombus dots indicate the simulation values of the light amount distribution, the solid line indicates an approximated line for the simulations values, "x" indicates a distance from the optical axis of the roof prism lens element 4*a*, and "X" indicates the visual field radius of the roof prism lens element 4*a* as shown in FIG. 21. In the simulation results of FIG. 22, the maximum light amount of the roof prism lens element 4*a* at x=0 (the optical axis) is equal to 1.0. In other words, the simulation results of the light amount distribution are normalized by the maximum light amount at the optical axis.

Figure 23:
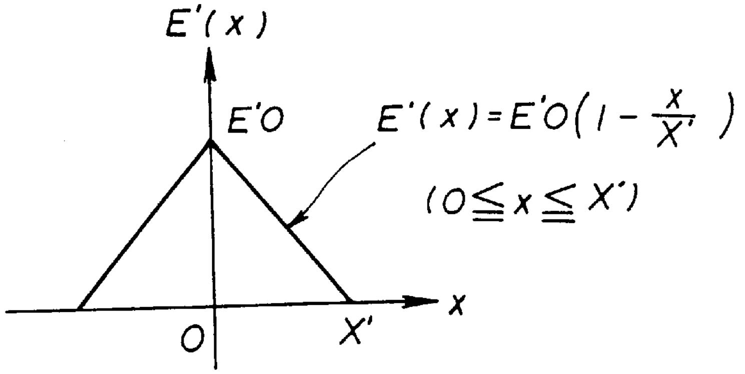
FIG. 23 is a diagram for explaining a light amount distribution of a single lens element of the roof prism lens array of FIG. 21.
Figure 24:
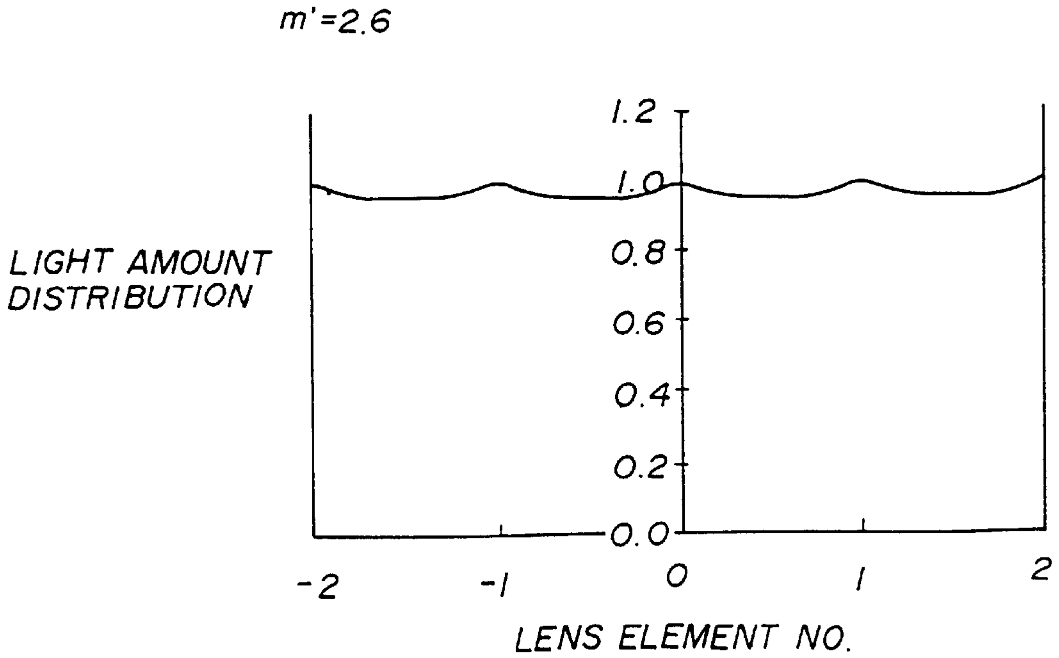
FIG. 24 is a diagram for explaining a light amount distribution of a first example of the roof prism lens array of FIG. 21.
Figure 25:
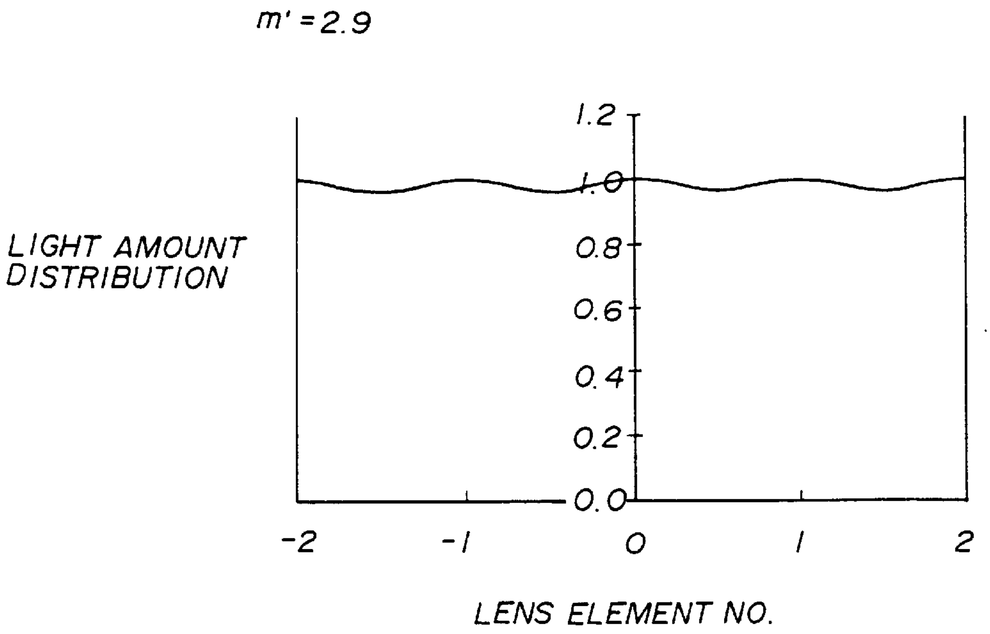
FIG. 25 is a diagram for explaining a light amount distribution of a second example of the roof prism lens array of FIG. 21.
Figure 26:
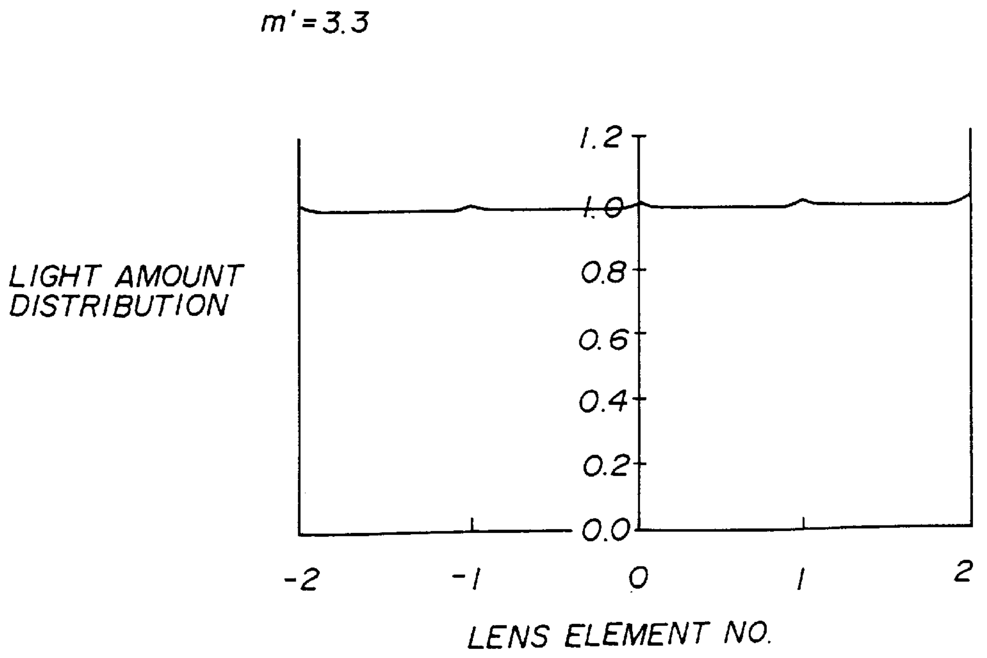
FIG. 26 is a diagram for explaining a light amount distribution of a third example of the roof prism lens array of FIG. 21.
Figure 27:
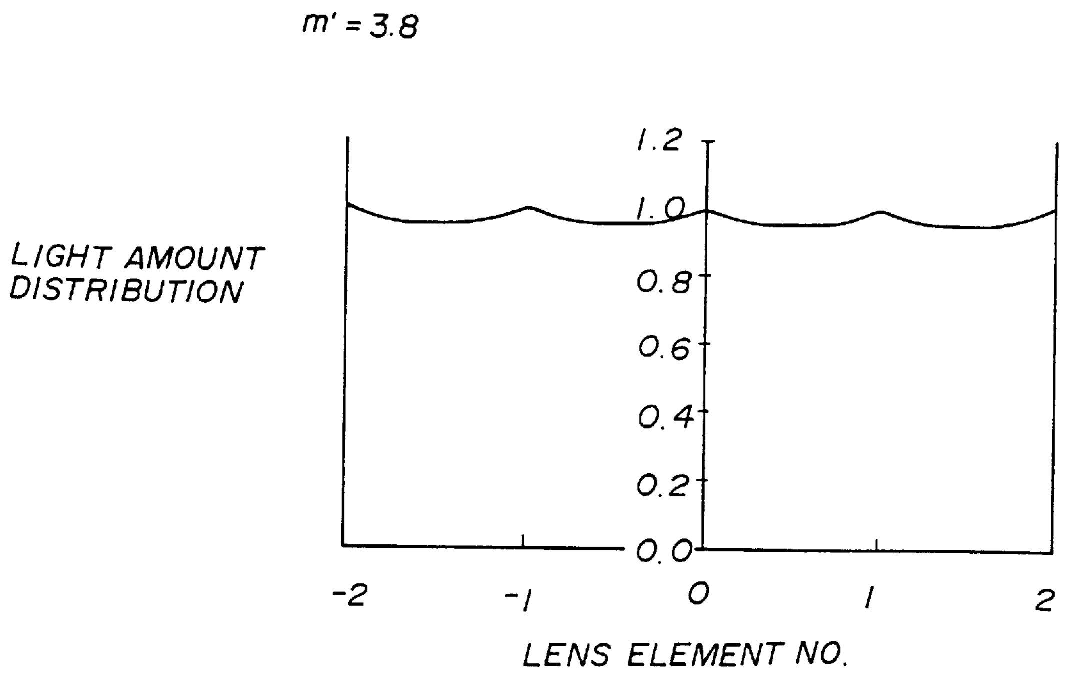
FIG. 27 is a diagram for explaining a light amount distribution of a fourth example of the roof prism lens array of FIG. 21.
Figure 28:
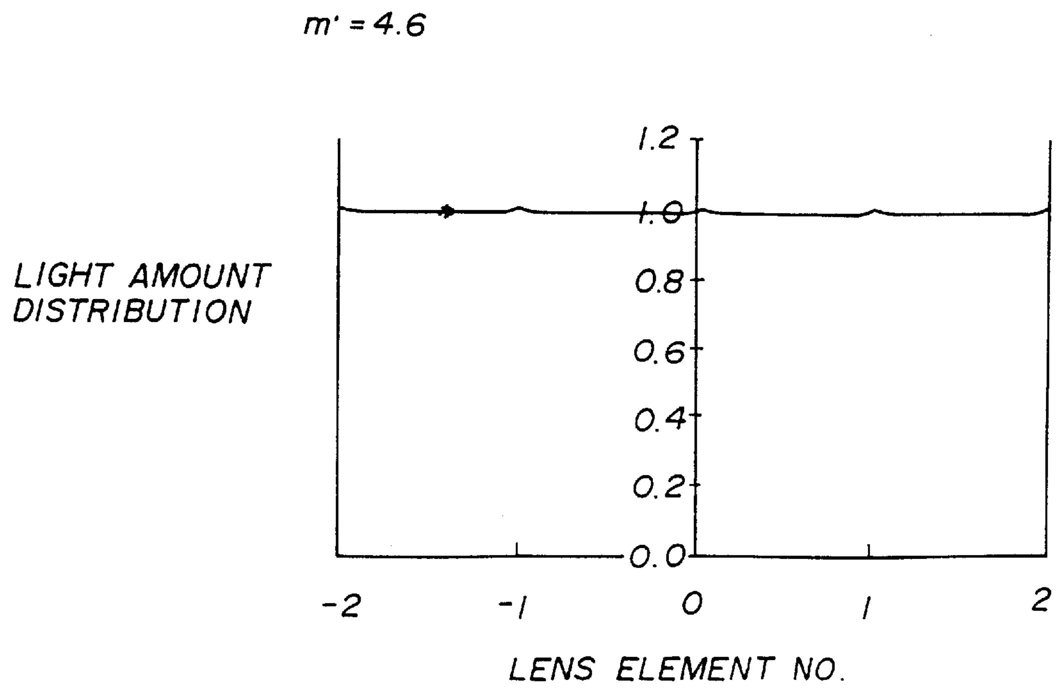
FIG. 28 is a diagram for explaining a light amount distribution of a fifth example of the roof prism lens array of FIG. 21.

FIG. 23 shows an approximated line of the light amount distribution of a single lens element of the roof prism lens array 4 of FIG. 21.

As shown in FIG. 23, the approximated line of the light amount distribution is represented by the equations:

$$E'(x)=E'o(1+x/X')(-X'<x<0)$$

$$E'(x)=E'o(1-x/X')(0<i\ x<X').$$

Hence, the light amount E'(x) of the roof prism lens element 4*a* is the maximum (=E'o) at the optical axis (x=0), and the light amount E'(x) is linearly decreased from the maximum (=E'o) as the distance from the optical axis in the array direction is increased. The light amount E'(x) of the roof prism lens element 4*a* is zero at x=X' or −X'. In the present embodiment, the light amount distribution of the roof prism lens array 4 is represented based on the approximated light amount distribution as shown in FIG. 23.

The light amount distribution of the roof prism lens array 4 in the third preferred embodiment of the optical writing device will now be explained. FIG. 24, FIG. 25, FIG. 26, FIG. 27 and FIG. 28 show respective light amount distributions of first, second, third, fourth and fifth examples of the roof prism lens array 4 of FIG. 21.

In each of these examples of the roof prism lens array 4 of FIG. 21, a plurality of roof prism lens elements 4*a* are arrayed in the array direction A, and the visual field radius X' of each roof prism lens element 4*a* in the array direction A is 2.3 mm (X'=2.3 mm).

The first example (FIG. 24) of the roof prism lens array 4 is configured such that the aperture diameter d of the lens element 4*a* in the array direction A is equal to 0.9 mm (d=0.9 mm) and the overlap ratio condition: m'=2.6 is satisfied.

The second example (FIG. 25) of the roof prism lens array 4 is configured such that the aperture diameter d of the lens element 4*a* in the array direction A is equal to 0.8 mm (d=0.8 mm) and the overlap ratio condition: m'=2.9 is satisfied.

The third example (FIG. 26) of the roof prism lens array 4 is configured such that the aperture diameter d of the lens element 4*a* in the array direction A is equal to 0.7 mm (d=0.7 mm) and the overlap ratio condition: m'=3.3 is satisfied.

The fourth example (FIG. 27) of the roof prism lens array 4 is configured such that the aperture diameter d of the lens element 4*a* in the array direction A is equal to 0.6 mm (d=0.6 mm) and the overlap ratio condition: m'=3.8 is satisfied.

The fifth example (FIG. 28) of the roof prism lens array 4 is configured such that the aperture diameter d of the lens element 4*a* in the array direction A is equal to 0.5 mm (d=0.5 mm) and the overlap ratio condition: m'=4.6 is satisfied.

In FIG. 24 through FIG. 28, the lens element number on the lateral axis indicates a position of the optical axis of the "i"th lens element in the roof prism lens array 4. The magnitude of light amount of the roof prism lens array on the longitudinal axis is normalized by the maximum light amount of each lens element. According to the above formula (1), the magnitude ΔE of the periodic variations of the light amount of the first example is 6%, the magnitude ΔE of the periodic variations of the light amount of the second example is 7%, the magnitude ΔE of the periodic variations of the light amount of the third example is 1%, the magnitude ΔE of the periodic variations of the light amount of the fourth example is 3%, and the magnitude ΔE of the periodic variations of the light amount of the fifth example is 2%.

As shown in FIG. 24 through FIG. 28, it is ascertained that the periodic variations of the light amount of the conventional lens array (which are on the order of 10% to 20%) are effectively reduced by the configuration of the roof prism lens array 4 in the third preferred embodiment. In order for the image forming apparatus to create a reproduced image with good quality, it is desirable to reduce the magnitude ΔE of the period variations of the light amount of the rod lens array to 3% or less. To attain the goal, it is necessary to configure the roof prism lens array 4 of the optical writing device to satisfy the overlap ratio condition: m'=X'/d>3.0.

Further, in the above-described embodiment, it is desirable that the array pitch of the roof prism lens array 4 of the optical writing device is below 1 mm. The visual sensitivity that is most perceivable to the human is on the order of 0.5 to 1 cycles/mm, and, if such frequency band is excluded, it is difficult for the human to perceive the periodic variations of photographic density in a reproduced image.

As described above, the shading portions 5 are provided on the roof prism lens array 4 of FIG. 21 in order to shade each roof prism lens element 4*a* from the flaring light from the adjacent lens element 4*a*. The flaring light from the focusing lens array causes the quality of a reproduced image to be degraded. Hence, it is needed to reduce the flaring light to such a negligible level that the image forming conditions of the image forming apparatus are satisfied.

Figure 29:
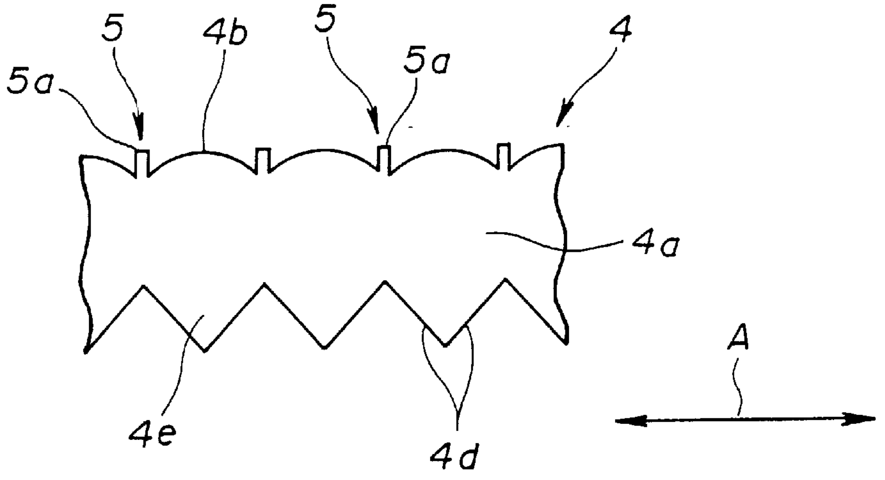
FIG. 29 is a diagram for explaining another configuration of the roof prism lens array in the third preferred embodiment.

FIG. 29 shows another configuration of the roof prism lens array in the third preferred embodiment. As shown in FIG. 21, the shading portions 5 may be formed by using metal plates or the like which are separate from the roof prism lens array 4. Alternatively, the shading portions 5 may be formed by providing a plurality of projections 5*a*, as shown in FIG. 29, which are integral with the roof prism lens array 4. An opaque material is applied or attached to these projections 5*a*.

Alternatively, in the third preferred embodiment, the rod lens array 3 of FIG. 2 may be provided in place of the roof prism lens array 4, and the opaque resin material 3*c* of the rod lens array 3 serves as the shading portions 5.

Further, in another preferred embodiment of the optical writing device of the present invention, a light source array having a plurality of rows of light sources which emit multiple light beams, and a focusing lens array having a plurality of rows of focusing lens elements which focus the light beams emitted by the light source array onto the photosensitive medium surface may be provided. In this embodiment, it is necessary to achieve accurate positioning between the light source rows and the focusing lens element rows. The focusing lens array in this embodiment may be configured in the same manner as in the first through third preferred embodiments described above. Namely, the focusing lens array is configured to satisfy the condition: m>2.0 where m is an overlap ratio of each of the focusing lens elements defined by the equation m=X/D, X indicates the visual field radius of each focusing lens element in the array direction, and D indicates the diameter of each focusing lens element in the array direction. Therefore, the optical writing device of the present invention is effective in reducing the periodic variations of light amount caused by the focusing lens elements of the conventional optical writing device.

Figure 30:
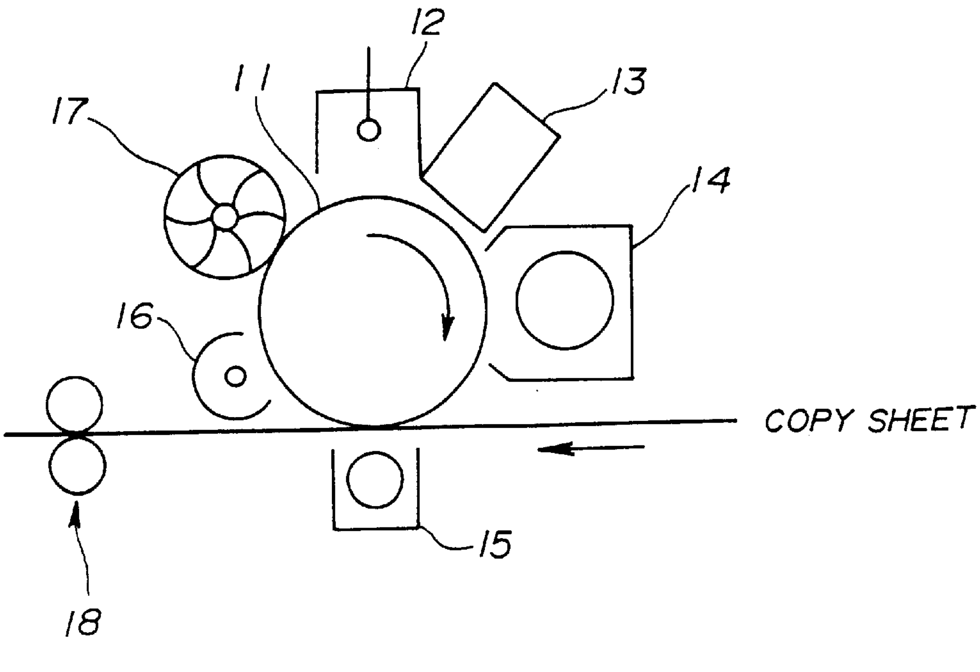
FIG. 30 is a diagram of one preferred embodiment of the image forming apparatus of the present invention.
Figure 31:
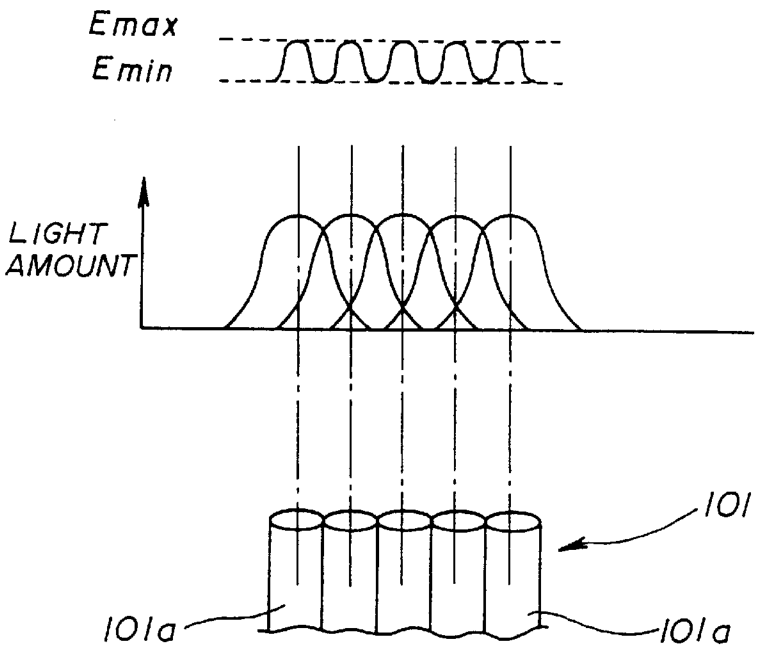
FIG. 31 PRIOR ART
FIG. 31 is a diagram for explaining a distribution of light amount of a rod lens array of a conventional optical writing device.
Figure 32:
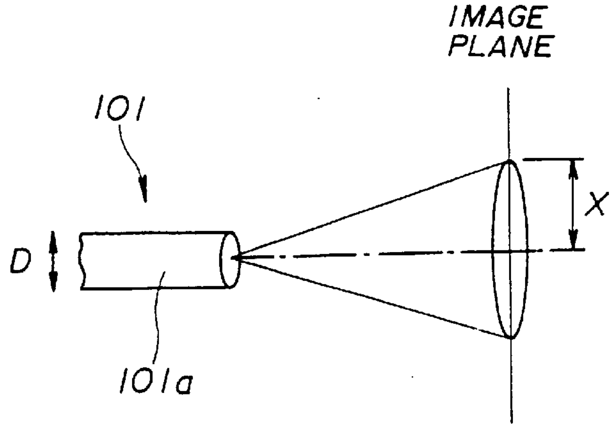
FIG. 32 PRIOR ART
FIG. 32 is a diagram for explaining a relationship between the rod lens diameter and the visual field radius in the conventional rod lens array of FIG. 31.

Finally, FIG. 30 shows one preferred embodiment of the image forming apparatus of the present invention.

In the image forming apparatus of FIG. 30, one of the above-described embodiments of the optical writing device is provided as an exposure unit that emits and focuses the light beams onto the surface of the photosensitive medium. An electrostatic latent image is formed on the photosensitive medium surface by exposing the surface to the imaging light pattern emitted and focused by the exposure unit as in the known electrophotographic printing process.

As shown in FIG. 30, the image forming apparatus of the present embodiment includes a photosensitive drum 11 which is provided as the photosensitive medium that is exposed to an imaging light pattern provided by an exposure unit 13. At surrounding portions around the photosensitive drum 11, a charging roller 12, the exposure unit 13, a developing unit 14, an image transfer roller 15, a charge removal unit 16, and a cleaner unit 17 are provided. A fixing unit 18 is provided in the vicinity of the image transfer roller 15.

In the image forming apparatus of FIG. 30, the exposure unit 13 according to one embodiment of the present invention is provided, and a scanned surface of the photosensitive drum 11, which is located between the charging roller 12 and the developing unit 14, is exposed to multiple light beams provided by the exposure unit 13.

Further, in the image forming apparatus of FIG. 30, a sheet transport passage is provided in order to transport a copy sheet from a cassette (not shown) to the fixing unit 18 via an image transfer position between the photosensitive drum 11 and the image transfer unit 15.

When an image forming operation is performed by the image forming apparatus of this embodiment, the photosensitive drum 11 is rotated at a constant speed in a clockwise rotation direction as indicated by the arrow in FIG. 30. The surface of the photosensitive drum 11 is uniformly charged by the charging unit 12. The charged surface of the photosensitive drum 11 is exposed to the multiple laser beams (the imaging light pattern) provided by the exposure unit 13, so that an electrostatic latent image is formed on the surface of the photosensitive drum 11. Further, the developing unit 14 develops the latent image of the photosensitive drum 11 with toner, and a toned image is produced on the surface of the photosensitive drum 11.

During the image forming operation, a copy sheet from the cassette (not shown) is delivered to the sheet transport passage as indicated by the arrow in FIG. 30. The leading end of this copy sheet is held at the image transfer position between the photosensitive drum 11 and the image transfer unit 15. At a timing that is synchronous to the time the toned image of the photosensitive drum 11 is moved to the image transfer position, the copy sheet is transported through the position between the image transfer unit 15 and the photosensitive drum 11. The image transfer unit 15 electrostatically transfers the toned image from the photosensitive drum 11 to the copy sheet.

The copy sheet, after the image transferring is performed, is delivered to the fixing unit 18. The fixing unit 18 performs a thermal fusing of the toner to the copy sheet. The copy sheet, after the thermal fusing is performed, is delivered through the sheet transport passage to an ejection position outside the image forming apparatus. The charge removal unit 16 removes the charge from the surface of the photosensitive drum 11 after the image transferring is performed. The cleaner unit 17 performs a cleaning of the residual toner from the surface of the photosensitive drum 11.

In the above-described image forming apparatus, the exposure unit 13, which is formed by one of the preferred embodiments of the optical writing device of the invention, is effective in reducing the periodic variations of light amount caused by the focusing lens elements of the conventional optical writing device. Therefore, the image forming apparatus and method in which the exposure unit 13 according to the present invention is provided can create good quality of a reproduced image and eliminate the periodic variations of photographic density in the reproduced image.

The present invention is not limited to the above-described embodiments, and variations and modifications may be made without departing from the scope of the present invention.

Further, the present invention is based on Japanese priority application No.2000-062652, filed on Mar. 7, 2000, the entire contents of which are hereby incorporated by reference.

What is claimed is:

1. An optical writing device comprising:

a light source array having an array of light sources configured to emit a plurality of light beams; and a focusing lens array having a row of focusing lens elements positioned to focus the light beams from the light source array onto a surface of a photosensitive medium, the focusing lens elements being arrayed in an array direction, each focusing lens element having a visual field radius X in the array direction and a diameter D in the array direction, wherein the focusing lens array is configured to satisfy the condition: m>2.0 where m is an overlap ratio of each of the focusing lens elements defined by the equation m=X/D.

2. An optical writing device comprising:

a light source array having an array of light sources configured to emit a plurality of light beams;

a focusing lens array having a row of focusing lens elements positioned to focus the light beams from the light source array onto a surface of a photosensitive medium, the focusing lens elements being arrayed in an array direction, each focusing lens element having a visual field radius X' in the array direction and an aperture diameter d in the array direction; and a plurality of shading portions disposed between the focusing lens elements of the focusing lens array, wherein the focusing lens array is configured to satisfy the condition: m'>2.0 where m' is an overlap ratio of each of the focusing lens elements defined by the equation m'=X'/d.

3. An optical writing device comprising:

a light source array having an array of light sources configured to emit a plurality of light beams; and a focusing lens array having a plurality of rows of focusing lens elements positioned to focus the light beams from the light source array onto a surface of a photosensitive medium, the focusing lens elements being arrayed in an array direction, each focusing lens element having a visual field radius X in the array direction and a diameter D in the array direction, wherein the focusing lens array is configured to satisfy the condition: m>2.0 where m is an overlap ratio of each of the focusing lens elements defined by the equation m=X/D.

4. The optical writing device of claim 1 wherein the focusing lens array is configured into a rod lens array.

5. The optical writing device of claim 1 wherein the focusing lens array is configured into a roof prism lens array.

6. The optical writing device of claim 5 wherein the roof prism lens array comprises a plurality of roof prism lens elements, each roof prism lens element having a generally rectangular aperture configuration that is perpendicular to an optical axis of the roof prism lens element.

7. The optical writing device of claim 2 wherein the focusing lens array is configured into a rod lens array.

8. The optical writing device of claim 2 wherein the focusing lens array is configured into a roof prism lens array.

9. The optical writing device of claim 8 wherein the roof prism lens array comprises a plurality of roof prism lens elements, each roof prism lens element having a generally rectangular aperture configuration that is perpendicular to an optical axis of the roof prism lens element.

10. The optical writing device of claim 3 wherein the focusing lens array is configured into a rod lens array.

11. An image forming apparatus comprising:

an optical writing device; and a photosensitive medium having a surface on which an electrostatic latent image is formed by exposing the surface to light emitted and focused by the optical writing device, wherein the optical writing device comprises:

a light source array having an array of light sources configured to emit a plurality of light beams; and a focusing lens array having a row of focusing lens elements positioned to focus the light beams from the light source array onto the surface of the photosensitive medium, the focusing lens elements being arrayed in an array direction, each focusing lens element having a visual field radius X in the array direction and a diameter D in the array direction, wherein the focusing lens array is configured to satisfy the condition: m>2.0 where m is an overlap ratio of each of the focusing lens elements defined by the equation m=X/D.

12. The image forming apparatus of claim 11, wherein the focusing lens array is configured into a rod lens arrays.

13. An image forming method comprising the steps of:

providing an optical writing device, the optical writing device comprising a light source array having an array of light sources configured to emit a plurality of light beams, and a focusing lens array having a row of focusing lens elements positioned to focus the light beams from the light source array onto a surface of a photosensitive medium;

controlling the light source array to emit the light beams; and forming an electrostatic latent image on the surface of the photosensitive medium by exposing the photosensitive medium surface to the light beams focused by the focusing lens array, wherein the focusing lens elements of the optical writing device are arrayed in an array direction, each focusing lens element having a visual field radius X in the array direction and a diameter D in the array direction, wherein the optical writing device is configured to satisfy the condition: $m>2.0$ where m is an overlap ratio of each of the focusing lens elements defined by the equation $m=X/D$.

14. An optical writing device comprising:

light emitting means for emitting a plurality of light beams; and focusing means for focusing the light beams from the light emitting means onto a surface of a photosensitive medium, focusing means having a row of focusing lens elements being arrayed in an array direction, each focusing lens element having a visual field radius X in the array direction and a diameter D in the array direction, wherein the focusing means satisfies the condition: $m>2.0$ where m is an overlap ratio of each of the focusing lens elements defined by the equation $m=X/D$.

* * * * *